United States Patent Office 3,777,033
Patented Dec. 4, 1973

3,777,033
BIS-CHROMONYL PHARMACEUTICAL COMPOSITION AND METHODS
Colin Fitzmaurice, Macclesfield, and Thomas Brian Lee, Loughborough, England, assignors to Fisons Pharmaceuticals Limited, Loughborough, England
No Drawing. Application Nov. 2, 1970, Ser. No. 77,711, now Patent No. 3,686,412, which is a continuation of abandoned application Ser. No. 765,722, July 30, 1968, which in turn is a division of application Ser. No. 536,281, Mar. 22, 1966, now Patent No. 3,419,578. Divided and this application Nov. 16, 1971, Ser. No. 199,360
Claims priority, application Great Britain, Mar. 25, 1965, 12,626/65; Dec. 9, 1965, 52,414/65
Int. Cl. A61k 27/00
U.S. Cl. 424—283   10 Claims

ABSTRACT OF THE DISCLOSURE

Pharmaceutical compositions comprising a pharmaceutical carrier together with a bis-chromonyl compound selected from compounds of the formula

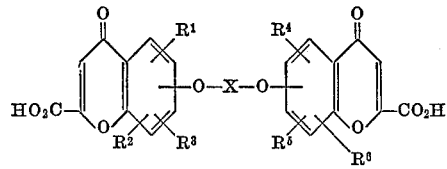

and functional derivatives thereof, in which $R^1$, $R^2$, $R^3$, $R^4$, $R^5$ and $R^6$ are each selected from the group consisting of hydrogen, halogen, hydroxy, lower alkyl, lower alkoxy, hydroxyloweralkyl, haloloweralkyl, hydroxyloweralkoxy, loweralkoxyloweralkoxy and carboxyloweralkoxy; and X is selected from the group consisting of saturated and unsaturated, straight and branched hydrocarbon chains which may be interrupted by at least one member selected from the group consisting of benzene rings, oxygen-containing heterocyclic rings, oxygen atoms and carbonyl groups, and which may be substituted by at least one member selected from the group consisting of halogen atoms, hydroxy groups and lower alkoxy groups, are useful in inhibiting antigen-antibody reactions.

This application is a division of application Ser. No. 77,711, filed Nov. 2, 1970, now U.S. Pat. No. 3,686,412 which application is a continuation of application Ser. No. 765,722, filed July 30, 1968 (now abandoned), which application is a division of application Ser. No. 536,281, filed Mar. 22, 1966, now U.S. Pat. No. 3,419,578.

This invention is concerned with improvements in or relating to new chemical compounds and pharmaceutical compositions containing them.

It has now been found that certain new chromone derivatives, as hereinafter defined, possess special activity as inhibitors of the effects of certain types of antigen-antibody reaction, as evidenced, for example, by in vivo tests.

According to the invention, therefore, there are provided as new compounds bis-chromonyl compounds of the formula:

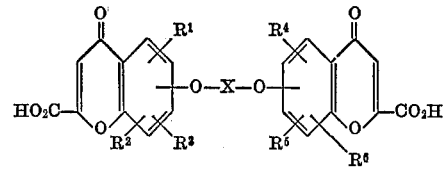

and functional derivatives thereof, in which $R^1$, $R^2$, $R^3$, $R^4$, $R^5$ and $R^6$ are the same or different and each is a hydrogen or halogen atom (e.g. a chlorine, bromine, iodine or fluorine atom), a lower alkyl (e.g. a methyl, ethyl, propyl, isopropyl, butyl or tertiaryl butyl group), hydroxy, lower alkoxy (e.g. a methoxy, ethoxy, propoxy, isopropoxy, butoxy or tertiary butoxy group) or substituted lower alkyl or lower alkoxy group (for example a hydroxyloweralkoxy, loweralkoxyloweralkoxy, carboxyloweralkoxy, hydroxyloweralkyl or haloloweralkyl such as chloro-, bromo-, iodo- or fluoro-loweralkyl) and X is a saturated or unsaturated, substituted or unsubstituted, straight or branched polymethylene chain which may be interrupted by one or more carbocyclic rings or oxygen containing heterocyclic rings (e.g. benzene, dioxan, tetrahydrofuran, or dihydropyran rings), oxygen atoms or carbonyl groups.

In general, it is preferred that not more than one of $R^1$, $R^2$ and $R^3$ and not more than one of $R^4$, $R^5$ and $R^6$ is other than hydrogen.

Accordingly a preferred embodiment of the invention is constituted by bis-chromonyl compounds of the formula:

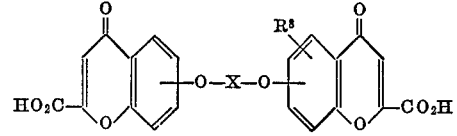

and functional derivatives thereof, in which $R^7$ and $R^8$ are the same or are different and each is a hydrogen or halogen atom or an alkyl, hydroxy, alkoxy or substituted alkoxy group, and X has the meaning defined above.

Particularly preferred compounds according to the invention are those in which all of $R^1$, $R^2$, $R^3$, $R^4$, $R^5$ and $R^6$ are hydrogen and accordingly a further preferred embodiment of the invention is constituted by bis-chromonyl compounds of the formula:

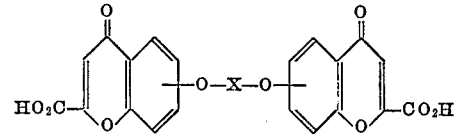

and functional derivatives thereof, in which X has the meaning defined above.

The group X may be any of a wide variety of groups. Thus for example, it may be a straight or branched saturated or unsaturated hydrocarbon chain. Further, X may be such a chain interrupted by one or more oxygen atoms, carbonyl groups or carbocyclic or heterocyclic rings and may be substituted by one or more halogen atoms (e.g. chlorine, bromine, iodine or fluorine atoms), or hydroxy or lower alkoxy (e.g. methoxy, ethoxy, propoxy, isopropoxy, butoxy, tert.butoxy, etc.) groups. Specific examples of the group X are groups of the formulae:

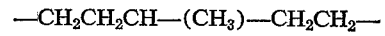
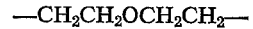

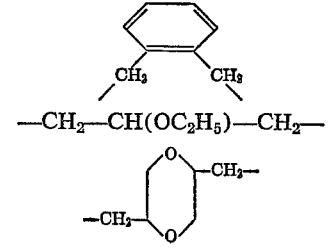

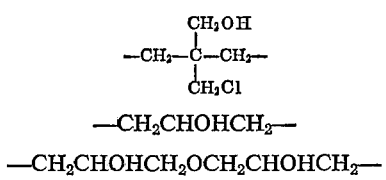

—CH$_2$CHOHCH$_2$—

—CH$_2$CHOHCH$_2$OCH$_2$CHOHCH$_2$— etc.

The group X is preferably a straight or branched hydrocarbon chain, which may be interrupted by one or more oxygen atoms, and contains from 3 to 7 carbon atoms. Desirably such a chain is substituted by one or more hydroxyl groups, a particularly preferred chain being the 2-hydroxy-trimethylene chain (—CH$_2$.CHOHCH$_2$—).

The chain —O—X—O— may link different or corresponding positions on the chromone molecules.

A particularly preferred compound according to the invention, in view of its activity, is 1,3-bis(2-carboxychromon-5-yloxy)-2-hydroxypropane of the formula:

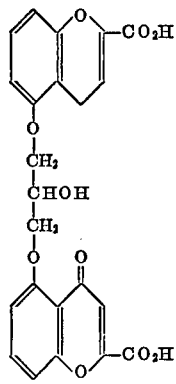

and its functional derivatives.

Functional derivatives of the compounds according to the invention include salts, esters and amides of one or more of the carboxylic acid functions present and esters of any hydroxylic functions present.

Salts of the bis-chromonyl compounds which may be mentioned are salts with physiologically acceptable cations, for example, ammonium salts, metal salts such as alkali metal salts (e.g. sodium, potassium and lithium salts) and alkaline earth metal salts (e.g. magnesium and calcium salts) and salts with organic bases, e.g. amine salts such as piperidine, triethanolamine and diethylaminoethylamine salts.

Esters which may be mentioned include simple alkyl esters (e.g. methyl, ethyl, propyl, isopropyl, butyl and tertiary butyl esters) and amides which may be mentioned include simple amides (for example amides with ammonia and lower alkylamines such as methylamine, ethylamine etc.) and more complex amides with amino acids such as glycine.

The new bis-chromonyl compounds according to the invention have been shown to inhibit the release and/or action of toxic products which arise from the combination of certain types of antibody and specific antigen, e.g. the combination of reaginic antibody with specific antigen. In man, it has been found that both subjective and objective changes which result from the inhalation of specific antigen by sensitised subjects are markedly inhibited by prior administration of the new bischromonyl compounds. Thus the new compounds are of great value in the prophylactic treatment of "extrinsic" allergic asthma. It has also been found that the new bis-chromonyl compounds are of value in the prophylactic treatment of so-called "intrinsic" asthma (in which no sensitivity to extrinsic antigen can be demonstrated).

It has also been found that in certain virus/antibody neutralisation systems the new bis-chromonyl compounds enhance the neutralising capacity of the antiserum, and thus the new compounds may find use in the treatment of viral infections.

According to a further feature of the invention, therefore, there is provided a pharmaceutical composition comprising a bis-chromonyl compound according to the invention, preferably in the form of a salt, in association with a pharmaceutical carrier or diluent. There is also provided a process for the manufacture of a pharmaceutical composition which comprises mixing a bis-chromonyl compound with a carrier or diluent.

The nature of the composition and the pharmaceutical carrier or diluent will, of course, depend upon the desired route of administration, i.e. orally, parenterally or by inhalation.

The compositions according to the invention are especially useful for the prophylactic treatment of asthma, i.e. the compositions are administered to the patient at regular intervals (e.g .4–6 hourly) in order to inhibit the effects of asthmatic attacks from which the patient may suffer. When employed in this manner, the dosage of composition is preferably such that from 1–50 mg. of active compound are administered to the patient at each administration.

In general, for the prophylactic treatment of asthma, the compositions will be in a form suitable for administration by inhalation. Thus the compositions may comprise a suspension or solution of the active ingredient in water for administration by means of a conventional nebulizer. Alternatively the compositions may comprise a suspension or solution of the active ingredient in a conventional liquified propellant such as dichlorodifluoromethane or chlorotrifluorethane to be administered from a pressurized container. The compositions may also comprise the solid active ingredient diluted with a solid diluent, e.g. lactose, for administration from a powder inhalation device.

The pharmaceutical compositions according to the invention generally contain a minor proportion of bis-chromonyl compound and a major proportion of carrier or diluent. Thus, for example, the solutions for administration by a conventional nebuliser will comprise a dilute solution, e.g. about 0.5%, in sterile water, and compositions comprising suspensions or solutions in pressurized propellants will contain, for example, about 2% of the active bis-chromonyl compound. However, where the composition comprises the solid bis-chromonyl compound diluted with a solid diluent, the diluent may be present in less, equal or greater amount then the solid active ingredient, for example the diluent may be present in an amount of from 50 to 150% by weight of the solid active ingredient.

The invention also includes within its scope a method of inhibiting the effects of the antigen-antibody reaction which comprises the prior application to the area of the antigen-antibody mechanism a therapeutically effective amount of a bis-chromonyl compound according to the invention.

According to a particular embodiment, the invention is for a method of relieving or preventing allergic airway obstruction which comprises administering to the patient a therapeutically effective amount (e.g. 1–50 mg.) at suitable intervals, of a bis-chromonyl compound according to the invention, particularly in the form of a salt.

The new compounds according to the invention are prepared by linking together two chromone-2-carboxylic acids or precursors therefor.

According to a further feature of the invention, therefore, there is provided a process for the preparation of bis-chromonyl compounds of the formula:

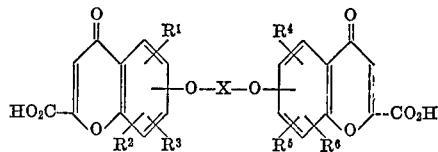

and functional derivatives thereof, in which R$^1$, R$^2$, R$^3$, R$^4$, R$^5$ and R$^6$ have the meanings defined above, which comprises reacting in one or more stages, (a) a compound of the formula:

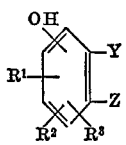

(b) a compound of the formula:

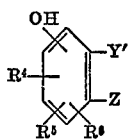

and (c) a compound of the formula:

A—X'—B in which Z is a hydroxy group and Y is a hydrogen atom, a group —COCH$_3$ or a group —COOR' (in which R' is an alkyl group), or Y and Z together form a chain

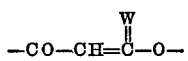

or a chain

(in which W is a carboxylic acid group or a functional derivative thereof or a group convertible to a carboxylic acid group or a functional derivative thereof), Y' and Z' have the same definition as Y and Z above and may be the same or different; and A and B are the same or different and each is a group capable of reacting with a hydroxyl group to form an ether linkage, or one of A and B is a group capable of being converted to such a reactive group; and X' is such that the group —A'—X'—B'— (in which A' and B' are the residues of A and B after the formation of ether linkages) has the same meaning as X; to form a compound of the formula:

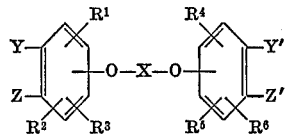

and, if necessary, intermediately or subsequently converting Y and Z and/or Y' and Z' to chains of the formula —CO—CH=C(COOH)—O—, or functional derivatives thereof.

As stated above, the process according to the invention may be carried out in one or more stages. Thus, it may be carried out in two stages as follows:

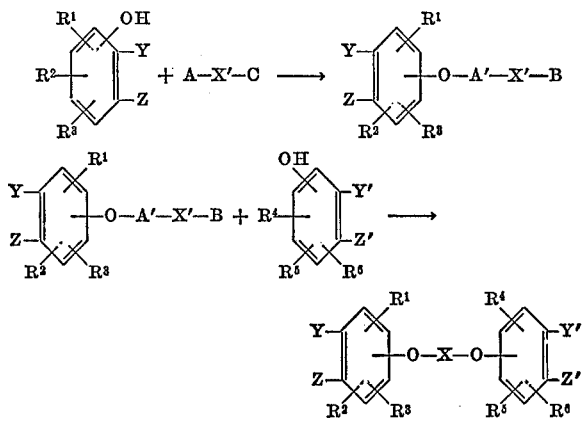

This procedure will generally be adopted when the two chromone moieties of the desired bis-chromonyl compound are different, i.e. when R$^1$, R$^2$ and R$^3$ are different from R$^4$, R$^5$, and R$^6$. In the two stage process, the groupings Y and Z or Y' and Z' may be modified at an intermediate stage but, in general, it is not preferred to follow this route. When the two chromone moieties of the desired bis-chromonyl compound are the same the reaction may be carried out in two stages, or preferably, if Y' and Z' have the same meaning as Y and Z, in one stage, i.e. by reaction of a compound of the formula:

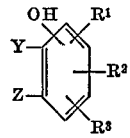

with a compound of the formula:

A—X'—B

When the reaction is carried out in two stages the compound A—X'—B may be such that one of A and B is a group capable of being converted to an ether linkage forming group. When both A and B are ether linkage forming groups, the first stage of a two stage reaction will, of course, be carried out using substantially equimolecular proportions of the two compounds.

Examples of groups A and B capable of reacting with a phenolic hydroxyl group, such that an ether linkage is formed by X' and the hydroxyl group, include halogen atoms, e.g. chlorine, bromine or iodine atoms, or other anion forming groups such as tosylate or methane sulphonate groups. Where the group A contains a hydroxy group beta to the subsequently formed ether linkage the group A or B may represent an epoxide group, giving rise to a residue A' or B' of —CH$_2$—CHOH—. The groups A and B may be the same or different; thus a compound A—X'—B capable of yielding a 2-hydroxy-trimethylene linkage is the compound:

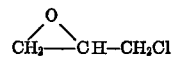

Groups capable of being converted to reactive groups such that an ether linkage may be subsequently formed include hydroxyl groups which may be converted to halogen substituents or other anion forming groups such as tosylate or methane sulphonate. The group A or B may alternatively be a vinyl group (—CH=CH$_2$) which may subsequently be converted to an epoxide or halohydrin group. Thus, an example of a compound A—X'—B which may be used to produce a 2-hydroxy-trimethylene linkage is allyl bromide.

The reaction between the chromone moiety or precursor therefor and the linking compound A—X'—B will be carried out under the conditions normally employed for the formation of ether linkages. Thus, the reaction will generally be carried out in the presence of aqueous alkali or a solvent such as acetone or dioxan and at elevated temperature. Where the ether linkage formation is carried out by reaction of the aromatic hydroxy group and a compound A—X'—B in which A and/or B is an anion forming group (e.g. halogen, methanesulphonate etc.) the reaction is desirably carried out in the presence of an acid binding agent such as an alkali metal carbonate (e.g. sodium carbonate or potassium carbonate) or an organic acid binding agent such as pyridine, diethylaniline or triethylamine. Where A and/or B is an epoxide group the ether forming reaction may be conveniently carried out in the presence of a suitable catalyst, e.g. in the presence of a quaternary ammonium hydroxide.

The conversion, if necessary, of Y and Z and/or Y' and Z' to the desired chain

—CO—CH=C(COOH)—O— or functional derivative thereof will be carried out simultaneously if Y and Z are the same as Y' and Z' and in separate stages if Y and Z are not the same as Y' and Z'. It is, however, generally preferred that Y and Z are the same as Y' and Z' since this reduces the number of chemical stages involved.

In the following description of methods of converting Y and Z to the desired chain

—CO—CH=C(COOH)—O— or functional derivatives thereof reference will only be made to one chromone moiety but it will, of course, be understood that where Y and Z are the same as Y' and Z' the process will act simultaneously on both moieties.

A preferred process involves the conversion of the compound in which Y is a group —CO—CH₃ and Z is a hydroxy group (i.e. a substituted o-hydroxyacetophenone) to a chain —CO—CH=C(COOR)—O— (in which R is a hydrogen atom or an alkyl group); i.e.

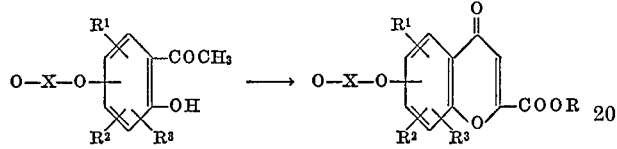

This reaction may be carried out by a number of routes. A preferred route involves the reaction of the o-hydroxyacetophenone with an oxalic acid derivative of the formula:

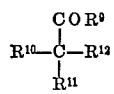

in which $R^9$ is a halogen atom or a group —OR' (in which R' is an alkyl group), $R^{10}$ and $R^{11}$ are both halogen atoms and $R^{12}$ is a group OR' or $R^{10}$ and $R^{11}$ together represent an oxygen atom (=O) and $R^{12}$ is a halogen atom or a group $OR^1$.

Thus a particularly preferred process involves a reaction of the ortho-hydroxy-acetophenone with a dialkyl oxalate, such as diethyl oxalate, preferably in the presence of a condensation agent such as an alkali metal alkoxide, e.g. sodium ethoxide, sodamide, metallic sodium or sodium hydride and conveniently in the presence of an organic solvent such as ether, dioxan, ethanol or benzene. This process goes through an intermediate of the formula:

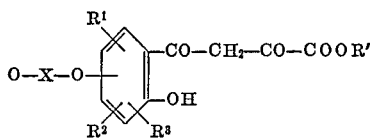

where R' is the alkyl group of the dialkyl oxalate, which intermediate may be cyclised directly by heating or may be isolated and cyclised by heating in a suitable solvent in the presence of a cyclisation agent such as an acid.

When the oxalic acid dervative is of the formula:

R'—O—C(Hal)₂—COOR'' in which R'' is an alkyl group, e.g. ethyl ethoxydichloroacetate, the reactants are desirably employed in substantially equimolecular proportions and the reaction is conveniently carried out in the presence of a metallic catalyst such as finely divided metallic platinum, palladium or ruthenium. When the oxalic acid derivative is of the formula:

Hal—CO—COOR' e.g. ethyl oxalyl chloride, the reaction is conveniently carried out in the presence of an acid binding agent. When the oxalate derivative is an oxalyl halide such as oxalyl chloride, the reaction is suitably carried out in the presence of an organic solvent and in the presence of an acid binding agent.

The o-hydroxy-acetophenone may also be condensed with an ester of glyoxalic acid to give a compound of the formula:

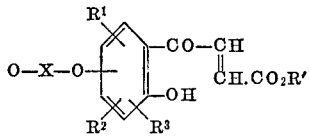

which may then be oxidatively cyclised to the desired chromone-2-carboxylic acid. Non-oxidative cyclisation gives rise to the corresponding chromanone which may be converted to the chromone as described below.

A different route for the formation of the desired chromonyl compound involves the conversion of Y and Z (when Y is —COCH₃ and Z is —OH) to an intermediate of the formula:

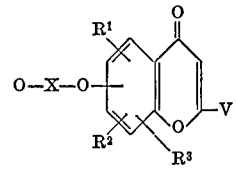

in which V is a group convertible to a carboxylic acid, or functional derivative thereof, and subsequent conversion of the group V to a carboxylic acid group or functional derivative thereof.

Examples of the group V are the nitrile group which may be hydrolysed to a carboxylic acid group and groups such as methyl, hydroxymethyl, halomethyl (e.g. chloromethyl, bromomethyl, dichloromethyl, trichloromethyl), formyl, acetyl, vinyl and styryl groups, oxidisable or hydrolysable to a carboxylic acid group.

The 2-methyl chromone may be prepared from the o-hydroxyacetophenone by condensation with an alkyl acetate, in a similar manner to the condensation described above for the dialkyl oxalate.

The 2-methyl chromone also serves as an intermediate in the preparation of a number of other oxidisable derivatives. Thus, the 2-methyl chromone may be converted into the corresponding 2-halomethyl-chromone, e.g. by reaction with hydrogen chloride and manganese dioxide in boiling acetic acid to produce a 2-chloromethyl chromone or by reaction with bromine in acetic acid to yield the 2-bromoethylchromone. The 2-halomethyl chromone may be oxidised to the corresponding chromone 2-carboxylic acid, for example, with potassium permanganate, or may be hydrolysed, using, for example, moist silver oxide, to give the 2-hydroxymethyl chromone which may then be oxidised to the chromone-2-carboxylic acid, for example, using chromium trioxide as oxidising agent in the presence of acetic acid and at ambient temperature or below.

The 2-methyl chromone may further be reacted with p-nitrosodimethylaniline and the reaction product hydrolysed with diluted mineral acid to give the corresponding 2-formyl-chromone which may be oxidised to the corresponding chromone-2-carboxylic acid using, for example, chromium trioxide as reagent.

Condensation of the 2-methyl-chromone with a benzaldehyde in the presence of a condensation catalyst gives the 2-styryl chromone which may be oxidised to the corresponding chromone-2-carboxylic acid, for example using potassium permanganate.

A number of the chromone derivatives, other than the 2-methyl chromone, convertible to the chromone-2-carboxylic acid may be prepared directly from the o-hydroxyacetophenone.

Thus, the 2-formyl chromone may be prepared by condensation of a dialkoxy acetate of the formula:

R'O)₂·CH—COOR'' in which R' and R'' have the meanings defined above, e.g. ethyl diethoxy acetate, with the o-hydroxy-acetophenone to yield an acetal which may subsequently be hydrolysed, e.g. with dilute mineral acid, to the aldehyde, which may subsequently be oxidised to the carboxylic acid.

The 2-formyl chromone may also serve as a starting point for the preparation of the 2-cyanochromone. Thus, the 2-formyl chromone may be reacted with hydroxylamine to yield the 2-oximino-chromone which may then be dehydrated to the 2-cyanochromone which may then be hydrolysed to the chromone-2-carboxylic acid or amide thereof under acid conditions.

The 2-styryl chromone may be prepared from the o-hydroxy-acetophenone by reaction with sodoumi cinnamate and cinnamic anhydride (i.e. by the Kostanecki reaction) or by reaction with a cinnamoyl halide, e.g. cinnamoyl chloride, in the presence of an acid binding agent to yield the cinnamate ester of the o-hydroxy-acetophenone followed by treatment with a base, e.g. potassium carbonate, in the presence of an inert solvent such as toluene or benzene to give an alpha-diketone of the formula:

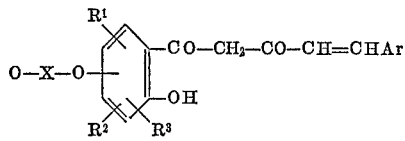

which is subsequently cyclised either by direct heating or by heating in the presence of a cyclisation agent (Baker Venkataraman reaction).

The 2-vinyl chromone may likewise be prepared from the o-hydroxy-acetophenone by reaction with ethyl acrylate.

The compound in which Y is a hydrogen atom and Z is a hydroxyl group, i.e., the phenol of the formula:

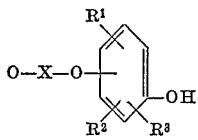

may be converted to the corresponding chromone-2-carboxylic acid by a number of methods.

For example, the chromone-2-carboxylic acid may be prepared by reaction of acetylene dicarboxylic acid or a dialkyl ester thereof, e.g. diethyl acetylene dicarboxylate, with the phenol or with an alkali metal phenate thereof.

Where the acetylene dicarboxylic acid or ester thereof is reacted with the alkali metal phenate, i.e. the compound of the formula:

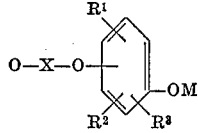

in which M is an alkali atom, the reaction is desirably carried out in the presence of an inert organic solvent or diluent to yield a fumarate of the formula:

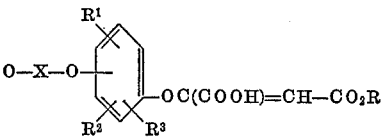

which is then, if necessary after hydrolysis, cyclised to the desired chromone-2-carboxylic acid, for example by heating in the presence of a cyclisation catalyst such as sulphuric acid. In a modification of this process the acetylene dicarboxylic acid or ester thereof is replaced by a halo-fumaric acid or an ester thereof, e.g. diethyl chlorofumarate, or by a dihalosuccinic acid or ester thereof.

The chromone-2-carboxylic acid may also be prepared from the phenol by reaction with a compound such as ethyl ethoxyalylacetate.

In another method the phenol may be esterified, e.g. with ethyl ethoxalyl chloride to give an ester of the formula:

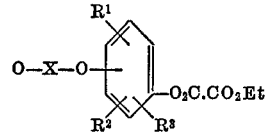

which may subsequently be cyclised in the presence of acetic acid or a derivative thereof (e.g. ethyl acetate or acetyl chloride) to give the desired chromone-2-carboxylic acid.

The phenol may alternatively be condensed with maleic anhydride to give a compound of the formula:

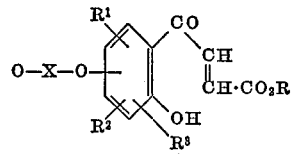

which may then be oxidatively cyclised to the desired chromone-2-carboxylic acid. Non-oxidative cyclisation gives rise to the corresponding chromanone which may then be converted to the chromone as described below.

The compound in which Z is a hydroxyl group and Y is a group —COOR', i.e. the substituted salicylic acid ester of the formula:

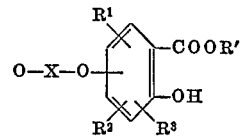

may be converted to the desired chromone-2-carboxylic acid by reaction with a pyruvate ester of the formula:

$$CH_3—CO—COOR'$$

if desired in the presence of a condensation agent such as an alkali metal alkoxide (e.g. sodium ethoxide), sodamide, metallic sodium or sodium hydride, and preferably in the presence of an organic solvent such as ethanol or dioxan.

When Y and Z together form a chain

in which W is the desired carboxylic acid group or functional derivative thereof, obviously no modification of Y and Z will be necessary. When W is group convertible to a carboxylic acid group, or a functional derivative thereof, it will have the same meaning as defined for V above and may be converted to the corresponding carboxylic acid group as described for V above.

When Y and Z together form a chain

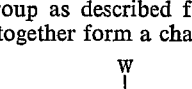

i.e. a chromanone, the group W will remain unchanged or be converted to a carboxylic acid group as necessary and further the chromanone will need to be dehydrogenated to the corresponding chromone; which dehydrogenation may be carried out either before or after any conversion of W.

The dehydrogenation of the chromanone of the formula:

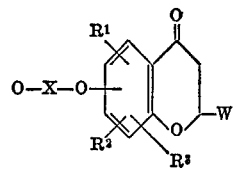

may, for example, be effected using selenium dioxide or other suitable dehydrogenating agents such as palladium black or chloranil.

Alternatively, dehydrogenation may be carried out by bromination followed by dehydrobromination. Thus, the chromanone may be brominated using N-bromosuccinimide in an inert solvent or by treatment with pyridinium perbromide in an inert solvent such as chloroform in the presence of a free radical catalyst such as benzoyl peroxide, to yield the 3-bromo derivative which may be subsequently dehydrobrominated.

The processes described above generally lead to the formation of the chromone-2-carboxylic acids as such or in the form of their esters. These may be readily converted to other functional derivatives, e.g. salts or amides, by conventional methods.

The majority of the intermediates produced by the linking of the two chromone moieties or precursors therefor are in themselves new.

According to the invention, therefore, there are provided as new compounds, compounds of the formula:

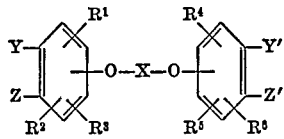

in which $R^1$, $R^2$, $R^3$, $R^4$, $R^5$, $R^6$, X, Y, Z, Y' and Z' have the meanings defined above, provided that not more than one of Y and Z and Y' and Z' represents a chain —CO—CH=C(COOH)—O— or a functional derivative thereof and further provided that when $R^1$, $R^2$, $R^3$, $R^4$, $R^5$ and $R^6$ are hydrogen and Y and Y' are groups $COCH_3$ and Z and Z' are hydroxyl groups, X is not a group —$CH_2$—CHOH—$CH_2$— linking the two positions para to the groups Y and Y'.

This invention also provides a process for the preparation of the new intermediates which comprises reacting in one or more stages:

(a) a compound of the formula:

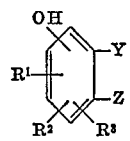

(b) a compound of the formula:

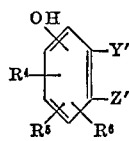

and (c) a compound of the formula:

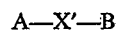

in which A and B have the meanings defined above.

In order that the invention may be well understood, the following examples are given by way of illustration only.

EXAMPLE 1

(a) 1,3-bis(2-acetyl-3-hydroxyphenoxy)propane

A mixture of 30.4 parts 2,6-dihdyroxyacetophenone, 20.2 parts of 1,3-dibromopropane and 12.8 parts powdered potassium carbonate were heated under reflux in 200 parts by volume of acetone for 72 hours. The acetone solution was filtered and the solid residue was washed first with acetone and then with water. The combined acetone filtrate and washings were evaporated leaving an oil which, on being boiled with ether, gave pale yellow crystals. These were combined with the first obtained solid and extracted with refluxing isopropanol in a Soxhlet extractor for several days to obtain 16.1 parts of 1,3-bis(2-acetyl-3-hydroxyphenoxy)propane as almost colourless crystals melting between 184° and 185° C. Analysis: Found: C, 65.4%; H, 5.68%. $C_{19}H_{20}O_6$ requires: C, 66.2%; H, 5.81%.

(b) Diethyl ester of 1,3-bis(2-carboxychromon-5-yloxy)propane

A solution of 6.9 parts 1,3 - bis(2 - acetyl - 3 - hydroxyphenoxy)propane in 15 parts by volume of diethyl oxalate was added to a solution of 3 parts sodium in 30 parts by volume of ethanol and 50 parts by volume of benzene and the mixture was heated gently under reflux for 20 hours. It was then poured into a large volume of ether and the precipitated solid was filtered, washed with ether and dried. It was then dissolved in water and acidified to obtain a sticky solid. This was boiled with about 50 parts of ethanol containing a catalytic amount of hydrochloric acid for about 10 minutes, when crystals began to form. The solution was cooled and filtered to obtain 7.4 parts of solid melting between 178° and 180° C. This was recrystallized from 200 parts by volume of a 1:2 mixture of benzene and ethanol to obtain a first crop of 4.5 parts of the diethyl ester of 1,3-bis(2-carboxychromon-5-yloxy)propane, melting between 182° and 183° C. Analysis: Found: C, 63.2%; H, 4.60%. $C_{27}H_{24}O_{10}$ requires: C, 63.7%; H, 4.72%.

(c) Disodium salt of 1,3-bis(2-carboxychromon-5-yloxy)propane

A suspension of 3 parts of the diethyl ester of 1,3-bis(2-carboxychromon-5-yloxy)propane in 50 parts by volume of boiling ethanol was treated with 11.6 parts by volume of 1.015 N aqueous sodium hydroxide. Water was added until a clear solution was obtained. This was treated with charcoal, filtered and concentrated by boiling, with the occasional addition of more ethanol. On cooling 2.2 parts of colourless crystals of the disodium salt of 1,3-bis(2-carboxychromon - 5 - yloxy)propane monohydrate were obtained. Analysis: Found: C, 54.1%; H, 2.86%. $C_{23}H_{14}Na_2O_{10}H_2O$ requires: C, 53.7%; H, 3.11%.

EXAMPLE 2

(a) 1,3-bis(2-acetyl-3-hydroxyphenoxy)-2-hydroxypropane

By the method of Example 1(a) 10 parts of 2,6-dihydroxyacetophenone, 4.6 parts potassium carbonate and 7.15 parts 1,3-dibromopropan-2-ol were reacted in acetone to obtain 3 parts of pure 1,3-bis(2-acetyl-3-hydroxyphenoxy)-2-hydroxypropane as colourless crystals melting between 165° and 166° C. Analysis: Found: C, 63.5%; H, 5.86%. $C_{19}H_{20}O_7$ requires: C, 63.3%; H, 5.56%.

(b) 1,3-bis(2-acetyl-3-hydroxyphenoxy)-2-hydroxypropane

To a solution of 970 parts of 2,6-dihydroxyacetophenone and 325 parts of epichlorohydrin in 2,500 parts of hot isopropanol was added, with stirring under reflux, a solution of 233 parts of 85% KOH in 2,500 parts of isopropanol and sufficient water (ca. 100 parts) to dissolve the solid. The mixture was heated, with stirring, under reflux for 48 hours. Half the solvent was then distilled off and 5000 parts of water were added. The mixture was cooled and the solid filtered off and washed with isopropanol and ether. It was then recrystallised from 12,500 parts of isopropanol to obtain a first crop of 380 parts and a second crop, after concentration, of 300 parts of 1,3-bis(2-acetyl-3-hydroxyphenoxy)-2-hydroxypropane identical with that obtained in Example 2(a) above.

(c) Diethyl ester of 1,3-bis(2-carboxychromon-5-yloxy)-2-hydroxypropane

By the method of Example 1(b) 4.6 parts of 1,3-bis(2-acetyl-3-hydroxyphenoxy)-2-hydroxypropane were reacted with diethyl oxalate and the product cyclised to obtain 4.4 parts of pure diethyl ester of 1,3-bis(2-carboxychromon-5-yloxy)-2-hydroxypropane as pale yellow crystals melting between 180° and 182° from a mixture of benzene and petrol. Analysis: Found: C, 61.5%; H, 4.61%. $C_{27}H_{24}O_{11}$ requires: C, 61.8%; H, 4.57%.

(d) Disodium salt of 1,3-bis(2-carboxychromon-5-yloxy)-2-hydroxypropane

By the method of Example 1(c), 4 parts of the diethyl ester of 1,3-bis(2-carboxychromon-5-yloxy)-2-hydroxypropane were saponified to obtain 3.2 parts of the disodium salt tetrahydrate as colourless crystals from aqueous alcohol. Analysis: Found: C, 47.8%; H, 3.8%; Na, 7.7%. $C_{23}H_{14}Na_2O_{11}4H_2O$ requires: C, 47.3%; H, 3.79%; Na, 7.7%.

(e) 1,3-bis(2-carboxychromon-5-yloxy)-2-hydroxypropane

A solution of the disodium salt of 1,3-bis(2-carboxychromon-5-yloxy)-2-hydroxypropane in water was acidified and the precipitate was recrystallised from ethanol plus ether to obtain 1,3-bis(2-carboxychromon-5-yloxy)-2-hydroxypropane monohydrate as colourless crystals melting with decomposition between 216° and 217°. Analysis: Found: C, 56.7%; H, 3.44%. $C_{23}H_{16}O_{11}H_2O$ requires: C, 56.8%; H, 3.70%. Dehydration of the monohydrate in vacuo at 110° C. gave the anhydrous acid melting between 241° and 242° C. with decomposition.

(f) Calcium salt of 1,3-bis(2-carboxychromon-5-yloxy)-2-hydroxypropane

The disodium salt of 1,3-bis(2-carboxychromon-5-yloxy)-2-hydroxypropane (0.8 part) dissolved in the minimum volume of warm water was treated with a solution of 0.225 part of calcium nitrate in a small volume of water, to obtain the sparingly soluble calcium salt. The mixture was cooled and filtered, and the solid was washed with cold water and dried at 110° C. Analysis: Found: Ca, 7.19%. $C_{23}H_{14}CaO_{11}3H_2O$ requires: Ca, 7.14%.

(g) Magnesium salt of 1,3-bis(2-carboxychromon-5-yloxy)-2-hydroxypropane

A suspension of 2-parts of 1,3-bis(2-carboxychromon-5-yloxy)-2-hydroxypropane in 20 parts of water was treated with 0.36 part of magnesium carbonate. The mixture was boiled with stirring until homogeneous, cooled, filtered and dried at 110° C. to obtain 2.3 parts of the magnesium salt.

(h) Dipiperidine salt of 1,3-bis(2-carboxychromon-5-yloxy)-2-hydroxypropane

A suspension of 2 parts of 1,3-bis(2-carboxychromon-5-yloxy)-2-hydroxypropane in 20 parts of water was treated with 0.7 part of piperidine. The mixture was warmed under reflux until a clear solution was obtained after which it was cooled and dehydrated by freeze-drying to obtain 2.8 parts of the dipiperidine salt of 1,3 - bis(2-carboxychromon-5-yloxy)-2-hydroxypropane. Analysis: Found: C, 59.0%; H, 6.12%; N, 4.00%. $C_{33}H_{36}NO_{11}.2H_2O$ requires: C, 59.1%; H, 5.67%; N, 4.18%.

EXAMPLE 3

(a) 1,4-bis(2-acetyl-3-hydroxyphenoxy)but-2-ene

By the method of Example 1(a), 15.2 parts of 2,6-dihydroxyacetophenone were condensed with 10.7 parts of 1,4-dibrombut-2-ene to obtain 6 parts of 1,4-bis(2-acetyl-3-hydroxyphenoxy)but-2-ene melting between 145° and 146° from acetone.

(b) 1,4-bis(2-carboxychromon-5-yloxy)but-2-ene

By the method of Example 1(b), 5 parts of 1,4-bis(2-acetyl-3-hydroxyphenoxy)but-2-ene were condensed with diethyl oxalate to obtain 3 parts of the diethyl ester of 1,4-bis(2-carboxychromon-5-yloxy)but-2-ene as yellow crystals melting between 215° and 217° C. from ethanol. Analysis: Found: C, 64.1%; H, 4.69%. $C_{28}H_{24}O_{11}$ requires: C, 64.6%; H, 4.6%.

Saponification of 2 parts of the diethyl ester of 1,4-bis(2-carboxychromon-5-yloxy)but-2-ene by the method of Example 1(c) gave 1.5 parts of the disodium salt. Acidification of an aqueous solution of this sodium salt gave the free acid monohydrate, melting between 193° and 195°. Analysis: Found: C, 59.6%; H, 3.56%. $C_{24}H_{16}O_{10}H_2O$ requires: C, 59.7%; H, 3.73%.

EXAMPLE 4

1,12-bis(2-carboxychromon-5-yloxy)-2,11-dihydroxy-4,9-dioxadodecane

A solution of 10 parts 2,6-dihydroxyacetophenone, 5.6 parts butane-1,4-diol diglycidyl ether and 0.1 part of 40% aqueous solution of benzyltrimethylammonium hydroxide in 14 parts dioxan was heated at 100° C. in a sealed vessel for 60 hours. The dioxan was removed under reduced pressure leaving a thick yellow oil. This was extracted several times with boiling ether and the combined extracts were fractionally precipitated with petrol. The first fraction, which was about 5 parts of a clear yellow oil, could not be crystallised or distilled but had an infra-red spectrum consistent with that expected for 1,12-bis(2-acetyl-3-hydroxyphenoxy)-2,11-dihydroxy - 4,9 - dioxadodecane. This was condensed with diethyl oxalate by the method of Example 1(b) to obtain 3 parts of the diethyl ester of 1,12 - bis(2-carboxychromon-5-yloxy)-2,11-dihydroxy-4,9-dioxadodecane as an oil. This oil was stirred and warmed with a saturated aqueous solution of sodium bicarbonate until dissolved. The solution was filtered and acidified with dilute hydrochloric acid. The precipitate was dissolved in ethanol plus ethyl acetate, treated with charcoal, filtered and precipitated with petrol and the solid was recrystallised from acetone plus ether to obtain 1 part of pure 1,12-bis(2-carboxychromon-5-yloxy)-2,11-dihydroxy-4,9-dioxadodecane dihydrate as colourless crystals melting with decompositon at 80° C. Analysis: Found: C, 55.3%; H, 5.24%. $C_{30}H_{30}O_{14}2H_2O$ requires: C, 55.3%; H, 5.22%.

1,12-bis(2 - carboxychromon-5-yloxy)-2,11-dihydroxy-4,9-dioxadodecane dihydrate (0.325 part) was dissolved in a solution of 0.084 part sodium bicarbonate in 100 parts water. The solution was filtered and freeze-dried to obtain 0.3 part of the disodium salt tetrahydrate. Analysis: Found: C, 48.7%; H, 4.75%. $C_{30}H_{28}Na_2O_{14}4H_2O$ requires: C, 49.3%; H, 4.9%.

EXAMPLE 5

(a) 1,4-bis(2-acetyl-3-hydroxyphenoxy)butane

By the method of Example 1(a) 2,6-dihydroxyacetophenone was reacted with 1,4-dibromobutane to obtain 1,4 - bis(2-acetyl-3-hydroxyphenoxy)butane melting between 219° and 221° C. from benzene. Analysis: Found: C, 66.0%; H, 6.0%. $C_{20}H_{22}O_6$ requires: C, 67.0%; H, 6.2%.

(b) Diethyl ester of 1,4-bis(2-carboxycromon-5-yloxy)butane

By the method of Example 1(b) 1,4-bis(2-acetyl-3-hydroxyphenoxy)butane was condensed with diethyl oxalate to form the diethyl ester of 1,4-bis(2-carboxychromon-5-yloxy)butane melting between 195° and 199° C. from a mixture of ethyl acetate and isopropanol. Analysis: Found: C, 62.4%; H, 5.1%. $C_{28}H_{26}O_{10}H_2O$ requires: C, 62.3%; H, 5.2%.

(c) 1,4-bis(2-carboxychromon-5-yloxy)butane

The diethyl ester of 1,4 - bis(2 - carboxychromon-5-yloxy)butane was hydrolysed by heating with aqueous sodium bicarbonate until dissolved, filtering and acidifying the solution. The precipitate was recrystallised from methanol to obtain pure 1,4 - bis(2-carboxychromon-5-yloxy) butane monohydrate melting between 228° and 230° C.

Analysis: Found: C, 58.6%; H, 3.95%. $C_{24}H_{18}O_{10}H_2O$ requires: C, 59.5%; H, 4.2%.

This acid was dissolved in an equivalent amount of sodium bicarbonate solution and freeze-dried to obtain the disodium salt.

EXAMPLE 6

1,5-bis(2-carboxychromon-5-yloxy)pentane 2,6-dihydroxyacetophenone was reacted with 1,5 - dibromopentane as in Example 1(a) to obtain 1,5-bis(2-acetyl-3-hydroxyphenoxy)pentane melting between 131° and 133° C. from benzene. Analysis: Found: C, 67.4%; H, 6.3%. $C_{21}H_{24}O_6$ requires: C, 67.7%; H, 6.5%.

This diketone was condensed with diethyl oxalate as in Example 1(b) to obtain the diethyl ester of 1,5-bis(2-carboxychromon-5-yloxy)pentane, melting between 150° and 152° C. from ethanol. Analysis: Found: C, 64.6%; H, 5.3%. $C_{29}H_{28}O_{10}$ requires: C, 64.8; H, 5.3%.

The ester was hydrolysed as in Example 5(c) to obtain the acid as a monohydrate melting between 226° and 228° C. from ethanol. Analysis: Found: C, 60.3; H, 4.7%. $C_{25}H_{20}O_{10}H_2O$ requires: C, 60.2; H, 4.4%.

The acid was subsequently converted to the disodium salt by the method of Example 5(c).

EXAMPLE 7

1,6-bis(2-carboxychromon-5-yloxy)hexane 2,6-dihydroxyacetophenone was reacted with 1,6-dibromohexane as in Example 1(a) to obtain 1,6-bis(2-acetyl-3-hydroxyphenoxy)hexane melting between 147.5° and 148.5° C. from ethanol. Analysis: Found: C, 68.1%; H, 6.7%. $C_{22}H_{26}O_6$ requires: C, 68.4%; H, 6.8%.

This diketone was condensed with diethyl oxalate by the method of Example 1(b) to obtain the diethyl ester of 1,6-bis(2-carboxychromon-5-yloxy)hexane melting between 154.5° and 155° C. from ethanol. Analysis: Found: C, 65.0%; H, 5.4%. $C_{30}H_{30}O_{10}$ requires: C, 65.4%; H, 5.5%.

The ester was hydrolysed as in Example 5(c) to obtain the acid monohydrate melting between 228° and 230° C. from dioxan. Analysis: Found: C, 60.2%; H, 4.9%. $C_{26}H_{22}O_{10}H_2O$ requires: C, 60.9%; H, 4.7%.

The disodium salt of the acid was subsequently prepared as in Example 5(c).

EXAMPLE 8

1,10-bis(2-carboxychromon-5-yloxy)decane 2,6-dihydroxyacetophenone was condensed with 1,10-dibromodecane as in Example 1(a) to obtain 1,10-bis(2-acetyl-3-hydroxyphenoxy)decane melting between 102.5° and 104° C. from ethyl acetate. Analysis: Found: C, 70.0%; H, 7.4%. $C_{26}H_{34}O_6$ requires: C, 70.6%; H, 7.7%.

This diketone was reacted with diethyl oxalate as in Example 1(b) to obtain the diethyl ester of 1,10-bis(2-carboxychromon-5-yloxy)decane melting between 146.5° and 148° C. from ethanol plus dioxan. Analysis: Found: C, 67.4%; H, 6.45%. $C_{34}H_{38}O_{10}$ requires: C, 67.3; H, 6.3%.

The ester was hydrolysed by boiling with aqueous sodium bicarbonate to obtain the sparingly soluble disodium salt which was recrystallised from water. Analysis: Found: C, 61.0%; H, 5.2%. $C_{30}H_{28}O_{10}$ requires: C, 60.6; H, 4.7%.

EXAMPLE 9

1,7-bis(2-carboxychromon-5-yloxy)-2,6-dihydroxy-4-oxaheptane 2,6-dihydroxyacetophenone was reacted with diglycidyl ether as in Example 4 to obtain 1,7-bis(2-acetyl-3-hydroxyphenoxy) 2,6-dihydroxy-4-oxaheptane melting between 129° and 131° C. from ethyl acetate plus petrol. Analysis: Found: C, 60.4%; H, 6.3%. $C_{22}H_{26}O_9$ requires: C, 60.8%; H, 6.0%.

This diketone was reacted with diethyl oxalate to obtain the bischromone diethyl ester as an oil which could not be crystallised. This ester was hydrolysed as in Example 5(c) to obtain 1,7-bis(2-carboxychromon-5-yloxy)-2,6-dihydroxy-4-oxaheptane monohydrate melting between 216° and 218° C. Analysis: Found: C, 55.6%; H, 3.4%. $C_{26}H_{22}O_{13}H_2O$ requires: C, 55.7%; H, 4.3%.

The disodium salt was subsequently prepared as in Example 5(c).

EXAMPLE 10

1,5-bis(2-carboxychromon-5-yloxy)-3-oxapentane 2,6-dihydroxyacetophenone was condensed with 2,2'-dibromodiethyl ether, as in Example 1(a) to obtain 1,5-bis(2-acetyl-3-hydroxyphenoxy)-3-oxapentane melting between 120.5° nd 121.5° C. from methanol. Analysis: Found: C, 63.5%; H, 5.1%. $C_{22}H_{22}O_7$ requires: C, 64.1%; H, 5.9%.

This was condensed with diethyl oxalate as in Example 1(b) to obtain the diethyl ester of 1,5-bis(2-carboxychromon-5-yloxy)-3-oxapentane melting between 129° and 131.5° C. from methanol. Analysis: Found: C, 62.3%; H, 4.9%. $C_{28}H_{26}O_{11}$ requires: C, 62.4%; H, 4.9%.

The ester was hydrolysed as in Example 5(c) to obtain the acid melting between 219° and 220° C. from ethanol plus dioxane. Analysis: Found: C, 59.8%; H, 3.9%. $C_{24}H_{18}O_{11}$ requires: C, 59.8%; H, 3.8%.

The disodium salt of the acid was subsequently prepared as in Example 5(c).

EXAMPLE 11

1,4-bis(2-carboxychromon-5-yloxy)-2,3-dihydroxybutane 2,6-dihydroxyacetophenone was reacted with 1,2:3,4-bisepoxybutane as in Example 4 to obtain 1,4-bis(2-acetyl-3-hydroxyphenoxy)-2,3-dihydroxybutane, melting between 211° and 212° C. from dioxan. Analysis: Found: C, 61.0%; H, 5.7%. $C_{20}H_{22}O_8$ requires: C, 61.5%; H, 5.7%.

This was condensed with diethyl oxalate as in Example 1(b) to obtain the diethyl ester of 1,4-bis(2-carboxychromon-5-yloxy)-2,3-dihydroxybutane melting between 224° and 226° C. Analysis: Found: C, 59.2%; H, 4.6%. $C_{28}H_{26}O_{12}$ requires: C, 60.6%; H, 4.7%.

This was hydrolysed by the method of Example 5(c) to obtain the acid as a dihydrate melting between 260° and 262° C. Analysis: Found: C, 54.0%; H, 3.7%. $C_{24}H_{18}O_{12}2H_2O$ requires: C, 54.0%; H, 4.1%.

This was subsequently converted to the disodium salt as in Example 5(c).

EXAMPLE 12

1,4-bis(2-carboxychromon-5-yloxy)-2-hydroxybutane 2,6-dihydroxyacetophenone was condensed with 1-bromo-3,4-epoxybutane by bolinig in acetone in presence of potassium carbonate to obtain 1,4-bis(2-acetyl-3-hydroxyphenoxy)-2-hydroxybutane melting between 207.5° and 208.5° C. from methanol. Analysis: Found: C, 63.4%; H, 5.8; $C_{20}H_{22}O_7$ requires: C, 64.2%; H, 5.9%.

This was condensed with diethyl oxalate as in Example 1(b) to obtain the diethyl ester of 1,4-bis(2-carboxychromon-5-yloxy)-2-hydroxybutane melting between 216° and 217° C. from a mixture of chloroform, ethyl acetate and petrol. Analysis: Found: C, 62.7%; H, 5.2%. $C_{28}H_2O_{11}$ requires: C, 62.4%; H, 4.9%.

This was hydrolysed as in Example 5(c) to obtain the acid as a monohydrate melting between 226° and 227° C. Analysis: Found: C, 57.1%; H, 3.9%. $C_{24}H_{18}O_{11}H_2O$ requires: C, 57.6%; H, 4.0%.

This was subsequently converted to the disodium salt as in Example 5(c).

EXAMPLE 13

1,5-bis(2-carboxychromon-7-yloxy)pentane

Ethyl 7-hydroxychromone-2-carboxylate was condensed with one half equivalent of 1,5-dibromopentane by heating in acetone in presence of potassium carbonate to obtain the diethyl ester of 1,5-bis(2-carboxychromon-7-yloxy)pentane melting between 148° and 150° C. from ethanol. Analysis: Found: C, 64.6%; H, 5.3%. $C_{29}H_{28}O_{10}$ requires: C, 64.8%; H, 5.3%.

This ester was hydrolysed as in Example 5(c) to obtain the acid melting between 283° and 284° C. Analysis: Found: C, 61.8%; H, 4.2%. $C_{25}H_{20}O_{10}$ requires: C, 62.4%; H, 4.2%.

The acid was subsequently converted to the disodium salt by the method of Example 5(c).

EXAMPLE 14

1,10-bis(2-carboxychromon-5-yloxy)-3,8-dioxa-4,7-dioxodecane

Ethyl 5-(2-hydroxyethoxy)chromone - 2 - carboxylate (1.4 parts) and 0.4 part succinyl chloride were dissolved in chloroform and treated with 0.5 part pyridine. The mixture was heated under reflux for 16 hours. The chloroform solution was washed with dilute hydrochloric acid, sodium carbonate solution and water and dried over sodium sulphate. The chloroform was distilled to leave an oil which was solidified by trituration with petrol. It was recrystallised from ethanol to obtain 0.2 part of the diethyl ester of 1,10-bis(2-carboxychromon-5-yloxy)-3,8-dioxa-4,7-dioxodecane melting between 144° and 146° C. Analysis: Found: C, 60.5%; H, 4.97%. $C_{32}H_{30}O_{14}$ requires: C, 60.2%; H, 4.69%.

EXAMPLE 15

1,5-bis(2-carboxy-8-chlorochromon-5-yloxy)pentane

A mixture of 4.62 parts of 1,5-bis(2-acetyl-3-hydroxyphenoxy)pentane (from Example 6) and 2.7 parts of sulphuryl chloride in 300 parts of dry ether was stirred for 7 hours at room temperature. The solution was filtered and evaporated to dryness leaving a yellow solid. This was recrystallised from ether to obtain 2.36 parts of 1,5 - bis(2-acetyl-4-chloro-3-hydroxyphenoxy)pentane as pale yellow prisms melting at 96° C.

This was condensed with diethyl oxalate as in Example 1(b) to obtain the diethyl ester of 1,5-bis(2-carboxy-8-chlorochromon-5-yloxy)pentane melting between 162° and 164° C. from ethanol. Analysis: Found: C, 57.7%; H, 4.3%. $C_{29}H_{26}Cl_2O_{10}$ requires: C, 57.5%; H, 4.3%.

The ester was hydrolysed as in Example 5(c) to obtain the acid, melting at 244° C. from ethanol. Analysis: Found: C, 54.2%; H, 4.6%; Cl, 12.9%. $C_{25}H_{18}Cl_2O_{10}$ requires: C, 54.7%; H, 3.28%; Cl, 12.9%.

The acid was converted to the disodium salt by the method of Example 5(c).

EXAMPLE 16

(a) 2-(2,3-epoxypropoxy)-6-hydroxyacetophenone

To a mixture of 5.68 parts of 2,6-dihydroxyacetophenone, 10.3 parts of epichlorohydrin and 3 parts (by volume) of ethanol which was stirred and gently refluxed, was added slowly to a solution of 2.58 parts of potassium hydroxide in 7 parts (by volume) of ethanol and 1 part by (volume) of water. The mixture was then stirred and refluxed for 1 hour, then after cooling an excess of water was added and the product was extracted into ether and the solution was dried over sodium sulphate. After removing the drying agent and the solvent 5 parts of a crude oil remained. This oil was extracted using hot petrol ether (B.P. 40–60°) and on cooling yellow crystals of 2-(2,3-epoxypropoxy) - 6 - hydroxyacetophenone M.P. 61–63° separated. Analysis: Found: C, 63.5%; H, 5.7%. $C_{11}H_{12}O_4$ requires: C, 63.45%; H, 5.8%.

(b) 1-(2-acetyl-3-hydroxyphenoxy)-3-(4-acetyl-3-hydroxyphenoxy)-2-hydroxypropane A mixture of 5 parts of 2-(2,3-epoxypropoxy)-6-hydroxyacetophenone, 3.8 parts of resacetophenone, 20 parts (by volume) of dioxan and 5 drops of trimethyl benzyl ammonium hydroxide solution were heated at 100° C. in a sealed bottle overnight. After cooling the product crystallised out and was recrystallised from dioxan to yield 2 parts of 1-(2-acetyl-3-hydroxyphenoxy)-3 - (4-acetyl-3-hydroxyphenoxy)-2-hydroxypropane melting between 182° and 185° C. Analysis: Found: C, 62.8%; H, 5.4%. $C_{19}H_{20}O_7$ requires: C, 63.3%; H, 5.6%.

(c) 2-(3-chloro-2-hydroxypropoxy)-6-hydroxyacetophenone

A mixture of 10 parts of 2,6-dihydroxyacetophenone, 7 parts of epichlorohydrin in 18 parts (by volume) of dioxan and 5 drops of Triton B, was heated at 100° C. in a sealed vessel for 2½ days. The solvent was then removed under reduced pressure and an excess of ether was added to the residue. The ether solution was decanted from the insoluble, washed with water (2×50 parts) and 2 N sodium carbonate (3×25 parts). The solvent was removed after drying over sodium sulphate and the residue was purified by chromatography using an alumina column and ether as eluent. The oil was distilled to obtain 2-(3-chloro-2-hydroxypropoxy) - 6 - hydroxyacetophenone (6 parts) as a yellow oil B.P. 166–8° at 1.5 mm. Analysis: Found: C, 53.7%; H, 5.26%. $C_{11}H_{13}ClO_4$ requires: C, 54.0%; H, 5.32%.

(d) 1-(2-acetyl-3-hydroxyphenoxy)-3-(4-acetyl-3-hydroxyphenoxy)-2-hydroxypropane To the above chlorohydrin (6 parts) was added 3.8 parts of resacetophenone, 3.5 parts of anhydrous potassium carbonate and 50 parts (by volume) of dry acetone. This mixture was refluxed for 2 days. Then the insoluble material was filtered, after cooling, and stirred in water to remove inorganic material. Recrystallisation of the residue from dioxan yielded 0.7 part of 1-(2-acetyl-3-hydroxyphenoxy) - 3 - (4-acetyl-3-hydroxyphenoxy)-2-hydroxypropane melting between 182° and 185° C. and identical with the product from (b) above. From the acetone filtrate a further 2 parts of this product were obtained.

(e) 1-(2-ethoxycarbonylchromon-5-yloxy)-3-(2-ethoxycarbonylchromon-7-yloxy)-2-hydroxypropane By the method of Example 1(b) 1-(2-acetyl-3-hydroxyphenoxy) - 3 - (4-acetyl-3-hydroxyphenoxy)-2-hydroxypropane was condensed with diethyl oxalate to form 1-(2-ethoxycarbonylchromon-5-yloxy)-3-(2 - ethoxycarbonylchromon-7-yloxy)-2-hydroxypropane melting between 193° and 194.5° C. from ethanol plus dioxan. Analysis: Found: C, 62.0%; H, 4.3%. $C_{27}H_{24}O_{11}$ requires: C, 61.8%; H, 4.6%.

(f) 1-(2carboxychromon-5-yloxy)-3-(2-carboxychromon-7-yloxy)-2-hydroxypropane The ester from (e) above was hydrolysed as in Example 5(c) to obtain the acid melting between 194° and 200° C. with preliminary softening. Analysis: Found: C, 55.2%; H, 3.96%. $C_{23}H_{16}O_{11}H_2O$ requires: C, 54.7%; H, 3.9%.

This acid was dissolved in an equivalent amount of sodium bicarbonate solution and freeze-dried to obtain the disodium salt.

EXAMPLE 17

(a) 1-(2-acetyl-3-hydroxyphenoxy)-5-(4-acetyl-3-hydroxyphenoxy)pentane

A mixture of 5.1 parts of 2,6-dihydroxyacetophenone, 7.7 parts of 1,5-dibromopentane, and 2.3 parts of anhydrous potassium carbonate in 100 parts (by volume) of anhydrous acetone was refluxed for 20 hrs. An examination of this mixture by thin layer chromatography showed unchanged 2,6-dihydroxy acetophenone, 1,5-bis(2-acetyl-3-hydroxyphenoxy)pentane and suspected 2-(5-bromopentyloxy)-6-hydroxyacetophenone to be present. The acetone solution was concentrated to half its volume and the residue was removed by filtration. After washing with water this residue yielded 1.9 parts of 1,5-bis(2-acetyl-3-hydroxyphenoxy)pentane. The filtrate was taken to dryness and chromatographed on an alumina column using ether as eluent. The 2-(5-bromopentyloxy)-6-hydroxyacetophenone came off in the first fractions, as confirmed by thin layer chromatography. Evaporation of these collected fractions yielded 5 parts as an oil which was used as follows without further purification. Thus a mixture of 2.4 parts of the crude oil, 1.2 parts of resacetophenone, 1 part of anhydrous potassium carbonate and 40 parts (by volume) of dry acetone was refluxed for 20 hrs. After cooling the acetone solution was filtered and evaporated to dryness. The residue was crystallised from methanol-water to yield 1.85 parts of 1-(2-acetyl-3-hydroxyphenoxy) - 5 - (4-acetyl-3-hydroxyphenoxy)pentane melting between 91° and 91.5° C. Analysis: Found: C, 67.3%; H, 6.7%. $C_{21}H_{24}O_6$ requires: C, 67.7%; H, 6.5%.

(b) 1-(2-ethoxycarbonylchromon-5-yloxy)-5-(2-ethoxycarbonylchromon-7-yloxy)pentane By the method of Example 1(b) 1-(2-acetyl-3-hydroxyphenoxy)-5-(4 - acetyl-3-hydroxyphenoxy)pentane was condensed with diethyl oxalate to yield the desired product crystallising from ethanol and melting between 149° and 152° C. Analysis: Found: C, 64.1%; H, 5.3%. $C_{29}H_{28}O_{10}$ requires: C, 64.9%; H, 5.3%.

(c) 1-(2-carboxychromon-5-yloxy)-5-(2-carboxychromon-7-yloxy)pentane

To 1.0012 parts of the above bis-ester in 30 parts (by volume) of methanol was added an amount of 0.969 N sodium hydroxide in methanol just sufficient for the ester hydrolysis. This mixture was then heated on the steam-bath for ½ hr., the solvent was distilled off and the residue was taken up in water and filtered, the filtrate was then acidified with dilute hydrochloric acid. The solid which separated proved difficult to filter and was, therefore, separated from the liquors by centrifuging, washing twice with water and recentrifuging. The 1-(2-carboxychromon - 5 - yloxy)-5-(2-carboxychromon-7-yloxy)pentane (0.25 part) was crystallized from ethanol and had a melting point between 249° and 251° C. with preliminary softening. Analysis: Found: C, 60.3%; H, 4.4%. $C_{25}H_{20}O_{10}.H_2O$ requires: C, 60.2%; H, 4.45%.

This acid was dissolved in an equivalent amount of sodium bicarbonate solution and freeze-dried to obtain the disodium salt.

EXAMPLE 18

(a) 1,3-bis(2-acetyl-3-hydroxy-5-methylphenoxy)-2-hydroxypropane

To a solution of sodium ethoxide in ethanol (from 0.83 part of sodium and 20 parts by volume of ethanol) was added a solution of 12 parts of 2,6-dihydroxy-4-methylacetophenone and 3.34 parts of epichlorohydrin in 10 parts (by volume) of ethanol. The resulting mixture was stirred and refluxed for 4 hrs.; after cooling 250 parts of water were added and the solid was isolated by filtration. Crystallisation of this solid from ethanol yielded 4.15 parts of 1,3-bis(2-acetyl-3-hydroxy-5-methylphenoxy)-2-hydroxypropane melting between 185° and 186° C. Analysis: Found: C, 64.1%; H, 6.3%. $C_{21}H_{24}O_7$ requires: C, 64.9%; H, 6.2%.

(b) 1,3-bis(2-carboxy-7-methylchromon-5-yloxy)-2-hydroxypropane

By the method of Example 1(b) the above compound was condensed with diethyl oxalate to yield 1,3-bis(2-ethoxycarbonyl-7-methylchromon-5-yloxy) - 2 - hydroxypropane crystallising from ethanol as colourless needles melting between 194° and 196° C. The ester was hydrolysed as in Example 5(c) to obtain the acid as the monohydrate crystallising from aqueous dioxan and melting between 240° and 241° C. Analysis: Found: C, 58.3%; H, 4.4%. $C_{25}H_{20}O_{11}.H_2O$ requires: C, 58.4%; H, 4.3%.

The acid was subsequently converted to the disodium salt by the method of Example 5(c).

EXAMPLE 19

(a) 1,3-bis(2-acetyl-4-ethyl-3-hydroxyphenoxy)-2-hydroxypropane 2,6-dihydroxy-3-ethylacetophenone was condensed with epichlorohydrin by the method of Example 18(a) to yield 1,3-bis(2-acetyl - 4 - ethyl-3-hydroxyphenoxy)-2-hydroxypropane melting between 135° and 137° C. (from ethanol). Analysis: Found: C, 66.7%; H, 6.9%. $C_{23}H_{28}O_7$ requires: C, 66.3%; H, 6.8%.

(b) 1,3-bis(2-carboxy-8-ethylchromon-5-yloxy)-2-hydroxypropane

The above compound was condensed with diethyl oxalate as in Example 1(b) to obtain 1,3-bis(2-ethoxycarbonyl-8-ethylchromon-5-yloxy) - 2 - hydroxpropane melting between 159° and 161° C. (from ethanol).

This ester was hydrolysed as in Example 5(c) to obtain the acid as the dihydrate crystallising from ethanol and melting between 193 and 194° C. Analysis: Found: C, 57.5%; H, 4.9%. $C_{27}H_{24}O_{11}.2H_2O$ requires: C, 57.85%; H, 5.0%.

The disodium salt was then prepared as in Example 5(c).

EXAMPLE 20

1-(2-carboxychromon-5-yloxy)-3-(2-carboxy-8-ethylchromon-5-yloxy)-2-hydroxypropane 2,6-dihydroxy-3-ethylacetophenone was condensed with 2-(2,3-epoxypropoxy)-6-hydroxyacetophenone as in Example 16(b) to yield 1-(2-acetyl-3-hydroxyphenoxy)-3-(2 - acetyl-4-ethyl-3-hydroxyphenoxy)-2-hydroxypropane melting between 102° and 103° C., from aqueous ethanol. Analysis: Found: C, 64.8%; H, 6.3%. $C_{21}H_{24}O_7$ requires: C, 64.9%; H, 6.2%.

This diketone was condensed with diethyl oxalate using the method of Example 1(b) and 1-(2-ethoxycarbonylchromon-5-yloxy) - 3 - (2-ethoxycarbonyl-8-ethylchromon-5-yloxy)-2-hydroxypropane was obtained, melting between 166° and 166.5° C. from ethanol. Analysis: Found: C, 62.6%; H, 4.95%. $C_{29}H_{28}O_{11}$ requires: C, 63.0%; H, 5.1%.

The ester was hydrolysed as in Example 5(c) to yield the acid dihydrate melting between 190° and 192° C. from ethanol. Analysis: Found: C, 56.8%; H, 4.4%. $C_{25}H_{20}O_{11}.2H_2O$ requires: C, 56.4%; H, 4.5%.

The disodium salt was prepared as in Example 5(c).

EXAMPLE 21

1,5-bis(2-carboxychromon-8-yloxy)pentane 2,3-dihydroxyacetophenone was condensed with 1,5-dibromopentane using the method of Example 1(a) to obtain 1,5-bis(2-hydroxy-3-acetylphenoxy)pentane, melting between 103.5° and 104.5° C. (from ethanol). Analysis: Found: C, 67.7%; H, 6.9%. $C_{21}H_{24}O_6$ requires: C, 67.7%; H, 6.5%.

This ketone was condensed with diethyl oxalate as in Example 1(b) to yield 1,5-bis(2-ethoxycarbonylchromon-8-yloxy)pentane melting between 128° and 130° C. (from ethanol). Analysis: Found: C, 64.5%; H, 5.4%. $C_{29}H_{28}O_{10}$ requires: C, 64.9%; H, 5.3%.

As in Example 5(c) this ester was hydrolysed to the acid monohydrate melting between 237° and 238° C.

(from ethanol). Analysis: Found: C, 59.9%; H, 4.3%. $C_{25}H_{20}O_{10}.H_2O$ requires: C, 60.2%; H, 4.45%.

This acid was then converted to the disodium salt as in Example 5(c).

EXAMPLE 22

1,5-bis(2-carboxy-8-methylchromon-7-yloxy)pentane 2,4-dihydroxy-3-methylacetophenone was condensed with 1,5-dibromopentane using the method of Example 1(a) to yield 1,5 - bis(4-acetyl-3-hydroxy-2-methylphenoxy)pentane melting between 116° and 117° C. (from ethanol). Analysis: Found: C, 68.4%; H, 7.3%. $C_{23}H_{28}O_6$ requires: C, 69.0%; H, 7.05%.

This product was condensed with diethyl oxalate as described in Example 1(b) to yield, after crystallisation from dioxan plus ethanol 1,5-bis(2-ethoxycarbonyl-8-methylchromon-7-yloxy)pentane, melting between 196° and 197° C. Analysis: Found: C, 65.7%; H, 6.05%. $C_{31}H_{32}O_{10}$ requires: C, 65.95%; H, 5.65%.

The ester was hydrolysed using the method as in Example 5(c) to obtain the acid melting between 274° and 276° C. from dioxan. Analysis: Found: C, 63.9%; H, 5.0%. $C_{27}H_{24}O_{10}$ requires: C, 63.8%; H, 4.8%.

The disodium salt of this acid was prepared as in Example 5(c).

EXAMPLE 33

1,3-bis(2-carboxy-2-methylchromon-7-yloxy)-2-hydroxypropane 2,4-dihydroxy-3-methylacetophenone was condensed with epichlorohydrin by the method of Example 18(a) and after crystallising from ethanol, 1,3-bis(4-acetyl-3-hydroxy-2-methylphenoxy)-2-hydroxypropane was obtained melting between 151° and 153° C. Analysis: Found: C, 64.5%; H, 6.25%. $C_{21}H_{24}O_7$ requires: C, 64.9%; H, 6.2%.

This ketone was then condensed with diethyl oxalate as described in Example 1(b) to yield 1,3-bis(2-ethoxycarbonyl-9-methylchromon-7 - yloxy) - 2 - hydroxypropane melting between 191 and 193° C., (from dioxan plus ethanol). Analysis: Found: C, 63.0%; H, 5.24%. $C_{29}H_{28}O_{11}$ requires: C, 63.0%; H, 5.1%.

The above ester was hydrolysed as in Example 5(c) to give 1,3-bis(2-carboxy-8-methylchromon-7-yloxy)-2 - hydroxypropane dihydrate melting between 272° and 275° C. Analysis: Found: C, 56.7%; H, 4.35%.

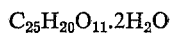

requires: C, 56.4%; H, 4.5%.

The disodium salt of the acid was prepared as in Example 5(c).

EXAMPLE 24

1,5-bis(2-carboxychromon-5-yloxy)-3-methylpentane 2,6-dihydroxyacetophenone was condensed with 1,5-dibromo-3-methylpentane by the method described in Example 1(a) to give 1,5-bis(2-acetyl-3-hydroxyphenoxy)-3-methylpentane melting between 123° and 124° C. (from ethanol). Analysis: Found: C, 68.8%; H, 6.9%. $C_{22}H_{26}O_6$ requires: C, 68.4%; H, 6.8%.

The ketone was then condensed with diethyl oxalate as in Example 1(b) to yield after crystallisation from ethanol 1,5-bis(2-ethoxycarbonylchromon-5-yloxy)-3 - methylpentane melting between 128° and 130° C. Analysis: Found: C, 65.3; H, 5.4%. $C_{30}H_{30}O_{10}$ requires: C, 65.4%; H, 5.5%.

Hydrolysis of the above ester by the method described in Example 5(c) yielded after crystallisation from aqueous ethanol 1,5-bis(2-carboxychromon-5-yloxy)-3-methylpentane monohydrate melting between 215° and 217° C. Analysis: Found: C, 61.6%; H, 4.8%. $C_{26}H_{22}O_{10}.H_2O$ requires: C, 60.9%; H, 4.7%.

This acid was converted to its disodium salt by the method described in Example 5(c).

EXAMPLE 25

1,3-bis(2-carboxy-6-chlorochromon-7-yloxy)-2-hydroxypropane. Disodium salt 2,4-dihydroxy-5-chloroacetophenone was condensed with epichlorohydrin using the method as described in Example 18(a) to yield, after crystallisation from n-propanol, 1,3-bis(4-acetyl-2-chloro-5-hydroxyphenoxy)-2-hydroxypropane melting between 197° and 199° C. Analysis: Found: C, 52.6%; H, 4.7%. $C_{19}H_{18}Cl_2O_7$ requires: C, 53.1%; H, 4.2%.

The ketone was condensed with diethyl oxalate as described in Example 1(b) to yield after crystallisation from ethanol, 1,3-bis(2-ethoxycarbonyl-6 - chlorochromon - 7-yloxy)-2-hydroxypropane melting between 199° and 202° C. Analysis: Found: C, 54.7%; H, 3.6%. $C_{27}H_{22}Cl_2O_{11}$ requires: C, 54.6%; H, 3.7%.

This ester was hydrolysed using the method described in Example 1(c) and the disodium salt of 1,3-bis(2-carboxy-6-chlorochromon-7-yloxy)-2-hydroxypropane tetrahydrate was obtained from aqueous ethanol.

EXAMPLE 26

1-(2-carboxychromon-5-yloxy)-3-(2-carboxy-6-chlorochromon-7-yloxy)-2-hydroxypropane. Disodium salt 2,4-dihydroxy-5-chloroacetophenone was condensed with 2-(2,3-epoxypropoxy)-6-hydroxyacetophenone as in Example 16(b) to give 1-(2-acetyl-3-hydroxyphenoxy)-3-(4-acetyl-2-chloro-5-hydroxyphenoxy)-2-hydroxypropane melting between 139° and 140° C.

This diketone was condensed with diethyl oxalate as described in Example 1(b) to yield after crystallisation from ethanol 1-(2-ethoxycarbonylchromon-5-yloxy)-3-(2-ethoxycarbonyl-6-chlorochromon-7-yloxy)-2-hydroxypropane melting between 166° and 168° C. Analysis: Found: C, 57.4%; H, 4.3%. $C_{27}H_{23}Cl_2O_{11}$ requires: C, 58.0%; H, 4.1%.

This ester was converted to the disodium salt using the method as described in Example 1(c) to give from aqueous ethanol the disodium salt of 1-(2-carboxychromon-5-yloxy)-3-(2-carboxy-6-chlorochromon-7-yloxy) - 2 - hydroxypropane tetrahydrate. Analysis: Found: C, 45.5%; H, 2.9%. $C_{23}H_{13}ClNa_2O_{11}.4H_2O$ requires: C, 44.6%; H, 3.4%.

EXAMPLE 27

1,5-bis(2-carboxychromon-6-yloxy)pentane

Quinacetophenone was condensed with 1,5-dibromopentane using the method described in Example 1(a) to obtain 1,5-bis(3-acetyl-4-hydroxyphenoxy)pentane melting between 107° and 109° C., from ethanol. Analysis: Found: C, 67.8%; H, 6.8%. $C_{21}H_{24}O_6$ requires: C, 67.7%; H, 6.5%.

The diketone was condensed, using the method as in Example 1(b), with diethyl oxalate to yield 1,5-bis(2-ethoxycarbonylchromon-6-yloxy)pentane. Analysis: Found: C, 64.7%; H, 5.5%. $C_{29}H_{28}O_{10}$ requires: C, 64.9%; H, 5.3%.

This ester was hydrolysed using the method described in Example 5(c) and yielded, after crystallisation from dioxan, 1,5-bis(2-carboxychromon-6-yloxy)pentane melting between 275° and 277° C. Analysis: Found: C, 62.6%; H, 4.5%. $C_{25}H_{20}O_{10}$ requires: C, 62.5%; H, 4.2%.

This acid was converted to its disodium salt by the method described in Example 5(c).

EXAMPLE 28

1,3-bis(2-carboxychromon-7-yloxy)-2-hydroxypropane

Resacetophenone was condensed with epichlorohydrin as in Example 18(a) to give 1,3-bis(4-acetyl-3-hydroxyphenoxy)-2-hydroxypropane melting between 152 and 154° C. (from ethanol). Analysis: Found: C, 63.5%; H, 6.2%. $C_{19}H_{20}O_7$ requires: C, 63.3%; H, 5.6%.

1,3-bis(4-acetyl - 3 - hydroxyphenoxy) - 2 - hydroxypropane was condensed with diethyl oxalate using the method as described in Example 1(b) to obtain 1,3-bis-(2-ethoxycarbonylchromon-7-yloxy) - 2-hydroxypropane melting between 178° and 180° C. (from aqueous dioxan). Analysis: Found: C, 62.2%; H, 4.5%. $C_{27}H_{24}O_{11}$ requires: C, 61.8%; H, 4.6%.

The ester was hydrolysed as in Example 5(c) to yield, after crystallisation from dioxan-water, 1,3-bis(2-carboxychromon-7-yloxy) - 2-hydroxypropane monohydrate melting between 155° and 165° C. Analysis: Found: C, 56.8%; H, 3.7%. $C_{23}H_{16}O_{11}.H_2O$ requires: C, 56.8%; H, 3.7%.

The disodium salt of this acid was prepared as in Example 5(c).

EXAMPLE 29

1,2-bis(2-carboxychromon-5-yloxymethyl)benzene 1,2-bis(bromomethyl)benzene was condensed with 2,6-dihydroxyacetophenone as described in Example 1(a) to give, after crystallisation from ethanol, 1,2-bis(2-acetyl-3-hydroxyphenoxymethyl)benzene melting between 148° and 153° C. Analysis: Found: C, 70.5%; H, 5.4%. $C_{24}H_{22}O_6$ requires: C, 70.9%; H, 5.5%.

The diketone was condensed with diethyl oxalate as in Example 1(b) to yield 1,2-bis(2-ethoxycarbonylchromon-5-yloxymethyl)benzene melting between 204°–206° C. Analysis: Found: C, 68.1%; H, 4.55%. $C_{32}H_{26}O_{10}$ requires: C, 67.4%; H, 4.6%.

This ester was saponified using the method as described in Example 1(c) to obtain the disodium salt as the tetrahydrate. Analysis: Found: C, 54.0%; H, 3.3%.

requires: C, 53.5%; H, 3.8%.

EXAMPLE 30

1,3-bis(2-carboxychromon-6-yloxy)-2-hydroxypropane

Quinacetophenone was condensed with epichlorohydrin as described in Example 18(a) to obtain after crystallisation from aqueous methanol 1,3-bis(3-acetyl-4-hydroxyphenoxy)-2-hydroxypropane melting between 127° and 129° C. Analysis: Found: C, 62.6%; H, 5.7%. $C_{19}H_{20}O_7$ requires: C, 63.3%; H, 5.6%.

This ketone was condensed as described in Example 1(b) with diethyl oxalate to yield 1,3-bis(2-ethoxy carbonylchromon-6-yloxy) - 2 - hydroxypropane melting between 187° and 189° C. (from ethanol-dioxan-water). Analysis: Found: C, 62.0%; H, 4.3%. $C_{27}H_{24}O_{11}$ requires C, 61.8%; H, 4.6%.

Hydrolysis of this ester using the method described in Example 17(c) gave 1,3-bis(2-carboxychromon-6-yloxy)-2-hydroxypropane dihydrate melting between 268° and 270° C. (from ethanol-dioxan-water). Analysis: Found: C, 55.0%; H,. 3.3%. $C_{23}H_{16}O_{11}.2H_2O$ requires: C, 54.7%; H, 3.9%.

The disodium salt of this acid was prepared as described in Example 5(c).

EXAMPLE 31

Disodium salt of 1-(2-carboxychromon-5-yloxy)-3-(2-carboxychromon-6-yloxy)-2-hydroxypropane Quinacetophenone was condensed with epichlorohydrin as described in Example 16(a) to yield, after crystallisation from petrol (B.P. 60–80° C.), 5-(2,3-epoxypropoxy)-2-hydroxyacetophenone melting between 76° and 79° C. Analysis: Found: C, 64.0%; H, 5.6%. $C_{11}H_{12}O_4$ requires: C, 63.45%; H, 5.8%.

This epoxide was condensed with 2,6-dihydroxyacetophenone as in Example 16(b) to yield 1-(2-acetyl-3-hydroxyphenoxy) - 3 - (3 - acetyl-4-hydroxyphenoxy)-2-hydroxypropane melting between 185° and 186° C., after crystallisation from ethanol. Analysis: Found: C, 63.5%; H, 5.6%. $C_{19}H_{20}O_7$ requires: C, 63.3%; H, 5.6%.

This compound was condensed with diethyl oxalate as in Example 1(b) and after crystallisation from ethanol, 1-(2 - ethoxycarbonylchromon - 5 - yloxy)-3-(2-ethoxy carbonylchromon-6-yloxy)-2-hydroxypropane was obtained melting between 164° and 166° C. Analysis: C, 62.4%; H, 4.5%. $C_{27}H_{24}O_{11}$ requires: C, 61.8%; H, 4.6%.

This ester was hydrolysed to the disodium salt using the method described in Example 1(c).

EXAMPLE 32

Disodium salt of 1-(2-carboxychromon-5-yloxy)-3-(2-carboxychromon-8-yloxy)-2-hydroxypropane 2- (2,3 - Epoxypropoxy)-6-hydroxyacetophenone was condensed with 2,3-dihydroxyacetophenone by the method described in Example 16(b) to give, after crystallisation from ethanol plus dioxan, 1-(2-acetyl-3-hydroxyphenoxy)-3-(3-acetyl-2-hydroxyphenoxy) - 2 - hydroxypropane melting between 166° and 169° C. Analysis: Found: C, 63.6%; H, 5.7%. $C_{19}H_{20}O_7$ requires: C, 63.3%; H, 5.6%.

After condensation with diethyl oxalate, as in Example 1(b), this compound gave 1-(2-ethoxycarbonylchromon-5-yloxy)-3-(2-ethoxycarbonylchromon-8-yloxy) - 2-hydroxypropane melting between 162° and 165° C. (from ethanol). Analysis: Found: C, 61.6%; H, 4.75%. $C_{27}H_{24}O_{11}$ requires: C, 61.8%; H, 4.6%.

This ester was saponified as described in Example 1(c) and the disodium salt was obtained.

EXAMPLE 33

1,8-bis(2-carboxychromon-5-yloxy)octane 2,6-dihydroxyacetophenone was condensed with 1,8-dibromooctane as in Example 1(a) to give 1,8-bis(2-acetyl-3-hydroxyphenoxy)octane melting between 107° and 109° C., from benzene. Analysis: Found: C, 69.6%; H, 7.25%. $C_{24}H_{30}O_6$ requires: C, 69.5%; H, 7.3%.

This diketone was reacted with diethyl oxalate in the usual manner (Example 1(b) to obtain after crystallisation from ethanol, 1,8-bis(2-ethoxycarbonylchromon-5-yloxy)octane melting between 139° and 141° C. Analysis: Found: C, 66.0%; H, 6.0%. $C_{32}H_{34}O_{10}$ requires: C, 66.4%; H, 5.9%.

Hydrolysis of this ester as in Example 5(c) yielded 1,8 - bis(2-carboxychromon-5-yloxy)octane monohydrate of indefinite melting point. Analysis: Found: C, 61.1%; H, 5.4%. $C_{28}H_{26}O_{10}.H_2O$ requires: C, 62.2%; H, 5.2%.

The disodium salt of this compound was prepared as in Example 5(c).

EXAMPLE 34

1,9-bis(2-carboxychromon-5-yloxy)nonane 2,6-dihydroxyacetophenone was condensed with 1,9-dibromononane as in Example 1(a) to yield 1,9-bis(2-acetyl-3-hydroxyphenoxy)nonane melting between 55°–59° C. after crystallising from ethanol. Analysis: Found: C, 69.7%; H, 7.5%; $C_{25}H_{32}O_6$ requires: C, 70.1%; H, 7.5%.

This diketone with diethyl oxalate gave, using the method of Example 1(b), 1,9-bis(2-ethoxycarbonylchromon-5-yloxy)nonane crystallising from ethanol and melting between 128° and 129° C. Analysis: Found: C, 66.4%; H, 6.2%. $C_{33}H_{36}O_{10}$ requires: C, 66.9%; H, 6.1%.

Hydrolysis of this ester as in Example 5(c) yielded 1,9 - bis(2-carboxychromon-5-yloxy)nonane, crystallising from dioxan plus petrol ether (B.P. 60–80°), melting between 123° and 127° C. Analysis: Found: C, 64.5%; H, 5.7%. $C_{29}H_{28}O_{10}$ requires: C, 64.9%; H, 5.3%.

The disodium salt of this acid was prepared as in Example 5(c).

EXAMPLE 35

1,2-bis(2-carboxychromon-5-yloxy)ethane 2,6-dihydroxyacetophenone was condensed with 1,2-dibromoethane using the method of Example 1(a) to obtain 1,2-bis(2-acetyl-3-hydroxyphenoxy)ethane melting between 188° and 189° C. after crystallisation from acetic acid. Analysis: Found: C, 65.7%; H, 5.4%. $C_{18}H_{18}O_6$ requires: C, 65.4%; H, 5.5%.

The condensation of this compound with diethyl oxalate was carried out as in Example 1(b) to yield after crystallization from dioxan 1,2-bis(2-ethoxycarbonylchromon-5-yloxy)ethane melting between 264 and 265° C. Analysis: Found: C, 63.0%; H, 4.7%. $C_{26}H_{22}O_{10}$ requires: C, 63.15%; H, 4.5%.

This ester was hydrolysed using the method as in Example 17(c) to give 1,2-bis(2-carboxychromon-5-yloxy)-ethane melting between 262° and 263° C. Analysis: Found: C, 59.6; H, 3.1%. $C_{22}H_{14}O_{10}$ requires: C, 60.3%; H, 3.2%.

The disodium salt of this acid was prepared in the manner described in Example 5(c).

EXAMPLE 36

1,3-bis(2-carboxychromon-5-yloxy)-2-chloromethyl-2-hydroxymethylpropane; dipotassium salt tetrahydrate 2,6-dihydroxyacetophenone was condensed with 3,3-bis-(chloromethyl)oxetane using the method as described in Example 1(a) to give 3,3-bis(2-acetyl-3-hydroxyphenoxymethyl)oxetane melting between 209° and 211° C. Analysis: Found: C, 65.3%; H, 5.75%. $C_{21}H_{22}O_7$ requires: C, 65.3%; H, 5.7%.

This oxetane (7 parts), 2 parts (by volume) of concentrated hydrochloric acid, 10 parts of water and 25 parts (by volume) of dioxan were heated under reflux together for 2 hrs. After filtering aqueous sodium carbonate was added until neutral and the yellow oil that precipitated crystallised on keeping. After recrystallising from ethanol 5.44 parts of 1,3-bis(2-acetyl-3-hydroxyphenoxy)-2-chloromethyl-2-hydroxymethylpropane were obtained melting between 148° and 150° C. Analysis: Found: C, 59.6%; H, 5.5%. $C_{21}H_{23}ClO_7$ requires: C, 59.6%; H, 5.4%.

This ketone was condensed with diethyl oxalate as in Example 1(b) to yield, after crystallising from ethyl acetate plus petrol ether (B.P. 40–60°), 1,3-bis(2-ethoxycarbonylchromon-5-yloxy)-2-hydroxymethylpropane melting between 165° and 168° C. Analysis: Found: C, 59.0%; H, 4.7%. $C_{29}H_{27}ClO_{11}$ requires: C, 59.3%; H, 4.6%.

To 0.8 part of the ester in 30 parts (by volume) of methanol was added 3.15 parts of a 0.87 N solution of potassium hydroxide in methanol. This solution was heated under reflux for 10 minutes, decolourised with charcoal, filtered and reduced in volume by evaporation until on cooling 6.0 part of the dipotassium salt of 1,3-bis(2-carboxychromon-5-yloxy)-2-chloromethyl-2-hydroxymethylpropane tetrahydrate crystallised. Analysis: Found: C, 44.4%; H, 3.4%. $C_{25}H_{17}ClK_2O_{11} \cdot 4H_2O$ requires: C, 44.3%; H, 3.9%.

EXAMPLE 37

Disodium salt of 1,3-bis(2-carboxychromon-5-yloxy)-2-ethoxypropane 1,3-bis(2-carboxychromon-5-yloxy)-2-hydroxypropane, diethyl ester, 15 parts, was suspended in 75 parts of ethyl iodide and 10 parts of freshly prepared silver oxide was added with stirring. The stirred suspension was heated under reflux for four days. The solids were then filtered, washed with cold ethanol and then extracted with boiling ethanol in a Soxhlet extractor to obtain 9.7 parts of a mixture of starting material with the required ethyl ether. This was separated by chromatography on a silica gel column using chloroform as eluent, to obtain 20% by weight of the pure diethyl ester of 1,3-bis(2-carboxychromon-5-yloxy)-2-ethoxypropane melting between 192 and 193° C. Analysis: Found: C, 63.1%; H, 5.06%. $C_{29}H_{28}O_{11}$ requires: C, 63.0%; H, 5.07%.

By the method of Example 1(c) this ester was converted to the disodium salt. Analysis: Found: C, 52.2%; H, 3.32%. $C_{25}H_{18}Na_2O_{22} \cdot 2H_2O$ requires: C, 52.1%; H, 3.85%.

EXAMPLE 38

Disodium salt of 1,3-bis(2-carboxychromon-5-yloxy)-2-oxopropane

A mixture of 4 parts diethyl ester of 1,3-bis(2-carboxychromon-5-yloxy)-2-hydroxypropane, 16 parts acetic anhydride and 24 parts dimethyl sulphoxide was ground in a revolving glass jar containing glass beads for three days. The mixture was then heated to 100° C., for two hours and filtered while still warm. The solid was washed with ethanol and recrystallised from a mixture of chloroform and petrol to obtain 1.2 parts of the diethyl ester of 1,3-bis(2-carboxychromon-5-yloxy)-2-oxopropane melting at 210° C. Analysis: Found: C, 61.6%; H, 4.61%. $C_{27}H_{22}O_{11}$ requires: C, 62.1%; H, 4.21%.

By the method of Example 1(c) part of this ester was converted to the sodium salt. Analysis: Found: C, 48.1%; H, 2.80%; Na, 7.85%. $C_{23}H_{12}Na_2O_{11} \cdot 4H_2O$ requires: C, 47.4%; H, 3.43%; Na, 7.9%.

EXAMPLE 39

(a) 2,5-bis(2-acetyl-3-hydroxyphenoxymethyl)dioxan

To a solution of 12.4 parts of 2,6-dihydroxyacetophenone in 50 parts of isopropanol under nitrogen was added a concentrated solution of 5.4 parts of potassium hydroxide in water. Benzene was added and the mixture distilled to remove water as an azeotrope. A solution of 15 parts of 2,5-bis.iodomethyl-dioxan in 50 parts of isopropanol was added and the mixture heated with stirring under reflux for three days. The solvent was distilled off and water added. The mixture was extracted with chloroform which was then evaporated to leave a red oil. This was extracted with boiling ether to leave 1 part of 2,5-bis(2-acetyl-3-hydroxyphenoxy methyl)-dioxan as an orange solid melting between 230° and 232° C. Analysis: Found: C, 63.7%; H, 5.89%. $C_{22}H_{24}O_8$ requires: C, 63.5%; H, 5.77%.

(b) Diethyl ester of 2,5-bis(2-carboxychromon-5-yloxymethyl)-dioxan

As in Example 1(b) 1 part of 2,5-bis(2-acetyl-3-hydroxyphenoxy methyl)dioxan was reacted with diethyl oxalate as far as the isolation of the sodium salt of the diketo ester. This was suspended in water and acidified with acetic acid to obtain an orange solid melting between 176 and 177° C. This was recrystallised from a mixture of ethanol and benzene to obtain a first crop of 0.3 part solid melting between 192 and 194° C. and which then solidified and remelted between 274° and 278° C. Analytical data and infra-red spectra suggest this product to be the diethyl ester of 1,6-bis(2-carboxychromon-5-yloxy) - 2 - hydroxy-5-hydroxymethyl-4-oxahexane produced by ring opening of the dioxan ring. A second crop of a solid melting between 276° and 280° C. was obtained by concentrating the filtrate. This was purified by recrystallisation from ethanol to obtain 0.2 part of the diethyl ester of 2,5-bis(2-carboxychromon-5-yloxymethyl)dioxan melting at 285° C. with decomposition. Analysis: Found: C, 62.3%; H, 4.61%. $C_{30}H_{28}O_{12}$ requires: C, 62.1%; H, 4.83%.

EXAMPLE 40

1,5-bis-(2-carboxychromon-5-yloxy)-pentane

A mixture of 37 parts of 1,5-bis(2-acetyl-3-hydroxyphenoxy) pentane and 52 parts by weight of ethyl ethoxydichloroacetate (80% purity) was heated at 150–170° for 5 hours. After evaporating under reduced pressure the mixture thus obtained, which contained the diethyl ester of the desired acid, was dissolved in acetic acid containing 17% concentrated hydrochloric acid. This solution was boiled under reflux for 4 hours. After cooling the solid was filtered off, washed with water and crystallised from ethanol to yield 1,5-bis(2-carboxychromon-5-yloxy)pentane monohydrate melting between 226 and

EXAMPLE 41

1,5-bis(2-carboxychromon-5-yloxy)pentane

To a mixture of 10 parts of 1,5-bis(2-acetyl-3-hydroxyphenoxy)pentane and 20 parts of pyridine cooled in ice was slowly added 13 parts of ethyl oxalylchloride. The mixture was then allowed to stand for 24 hours and then heated at 100° for 30 minutes. After cooling, and pouring onto a mixture of ice and excess of concentrated hydrochloric acid an oil was formed which was extracted with chloroform, washed, and the chloroform solution was dried over sodium sulphate. After filtration and removal of the solvent the residue was crystallised from ethanol to give the diethyl ester of 1,5-bis(2-carboxychromon-5-yloxy)pentane melting between 150 and 152° and shown to be identical with a sample as prepared in Example 6.

EXAMPLE 42

(a) 1,5-bis(2-methylchromon-5-yloxy)pentane

A mixture of 4.6 parts of powdered sodium, 7.44 parts of 1,5-bis(2-acetyl-3-hydroxyphenoxy)pentane and 150 parts of ethyl acetate was heated under reflux for 2½ hours with stirring.

The resulting orange solution was cooled and diluted with 400 parts of ether. The precipitated solid was extracted with water and the extract was acidified with dilute hydrochloric acid. The precipitated oil was extracted with chloroform and the chloroform solution was dried over anhydrous sodium sulphate, filtered, and the solvent was then removed to yield a red oil.

This oil was heated under reflux with ethanol and 0.5 part of concentrated hydrochloric acid for 10 minutes. The solution was evaporated to leave an oil which was triturated with ether and the resulting solid was collected. This solid was crystallised from a mixture of ethyl acetate and petroleum ether (B.P. 40–60° C.) to give 4.82 parts of 1,5-bis(2-methylchromon-5-yloxy)pentane, melting point 140–3° C. The ether wash afforded a further 0.4 part of the same material. Analysis: Found: C, 71.00%; H, 5.87%. $C_{25}H_{24}O_6$ requires: C, 71.41%; H, 5.75%.

(b) 1,5-bis(2-carboxychromon-5-yloxy)pentane

To a mixture of 5 parts of 1,5-bis(2-methylchromon-5-yloxy)pentane in 100 parts of dioxan was added 6 parts of finely divided selenium dioxide and the mixture was heated under reflux for 6 hours. After cooling, the precipitated selenium was filtered off and the solvent was removed from the filtrate under vacuum. The residue was dissolved in chloroform and the chloroform was extracted with sodium bicarbonate solution. The crude product was precipitated upon addition of hydrochloric acid to the alkaline extract and it was crystallised from ethanol to yield 1,5-bis(2-carboxychromon-5-yloxy)pentane as the monohydrate melting between 226 and 228°, identical with the material prepared in Example 6.

EXAMPLE 43

(a) 1,5-bis(2-styrylchromon-5-yloxy)pentane

A solution of sodium ethoxide was prepared from 0.294 part of sodium and 8.0 parts of ethanol. To this was added with stirring over 10 minutes a mixture of 1.5 parts of benzaldehyde and 2.7 parts of 1,5-bis(2-methylchromon-5-yloxy)pentane in 35 parts of ethanol. The mixture was stirred and heated under reflux for 4 hours and then allowed to stand at room temperature for 16 hours.

The brown oily solid which had precipitated was filtered off and triturated with ether. The resulting solid was filtered off and dissolved in glacial acetic acid. The solution was treated with charcoal, filtered, and diluted with water to give 1.55 parts of 1,5-bis(2-styrylchromon-5-yloxy)pentane, melting point 217–220° C. Analysis: Found: C, 77.4%; H, 5.87%. $C_{39}H_{32}O_6$ requires: C, 78.50%; H, 5.41%.

(b) 1,5-bis(2-carboxychromon-5-yloxy)pentane

A solution of 10 parts of potassium permanganate in 200 parts of water was added to a solution of 5 parts of 1,5-bis(2-styrylchromon-5-yloxy)pentane in 50 parts of pure pyridine. The mixture was stirred at room temperature for several hours. The presence of excess of potassium permanganate was checked from time to time and further amounts of a 5% aqueous solution of potassium permanganate were added as required. When no further oxidation took place the solution was acidified with hydrochloric acid and sulphur dioxide was passed to decolourise. The precipitated material was filtered off, washed with hot water and extracted with sodium bicarbonate solution. On acidification the product was precipitated and was filtered off, dried, and crystallised from ethanol to yield 1,5-bis(2-carboxychromon-5-yloxy)pentane monohydrate melting between 226 and 228° and shown to be identical with the material prepared in Example 6.

EXAMPLE 44

1,3-bis(2-ethoxycarbonylchromon-7-yloxy)-2-hydroxypropane

A solution of sodium ethoxide was prepared from 0.115 part of sodium and 30 parts of ethanol. To this was added a mixture of 2.34 parts of ethyl-7-hydroxychromon-2-carboxylate and 0.462 part of epichlorohydrin. The mixture was stirred and heated under reflux for 4 hours.

Half of the ethanol was evaporated off and the remaining mixture was diluted with 300 parts of water. The aqueous solution was then extracted with chloroform. The organic solution was dried over anhydrous sodium sulphate, filtered, and evaporated to leave a red oil. The yellow solid obtained by trituration of this oil with ethanol was filtered off and washed with alcohol giving 0.12 part of 1,3-bis(2-ethoxycarbonylchromon-7-yloxy)-2-hydroxypropane, melting point 178–9° C. The identity of the product with a sample as prepared in Example 28 was confirmed by a mixed-melting point determination, by thin layer chromatography, and by infra-red analysis.

EXAMPLE 45

1,5-bis(2-carboxychromon-6-yloxy)pentane

A solution of 5.7 parts of 1,5-dibromopentane in 80 parts of ethanol was added to a solution of 5.6 parts of potassium hydroxide and 33 parts of hydroquinone in 40 parts of ethanol. The mixture was heated under reflux for 16 hours, then the ethanol was evaporated off and the mixture was dilutued with 200 parts of water, acidified with concentrated hydrochloric acid and the resulting precipitate was filtered off. The solid thus obtained was extracted with hot benzene and the solution was treated with charcoal and filtered whilst hot. The solution on cooling, yielded 4.9 parts of 1,5-bis(4-hydroxyphenoxy)pentane melting point 110–12°. Analysis: Found: C, 71.7%; H, 7.14%. $C_{17}H_{20}O_4$ requires: C, 70.8%; H, 6.99%.

5.8 parts of 1,5-bis(4-hydroxyphenoxy)pentane were treated with a solution of 1.6 parts of sodium hydroxide in 10 parts of water. Water was evaporated from the mixture and the solid was dried in an oven at 100°. The solid was treated with 50 parts of dioxan and the mixture was stirred and heated under reflux. Subsequently, 6.8 parts of diethyl acetylenedicarboxylate were added dropwise to the mixture, which was stirred and heated under reflux for 50 minutes. The mixture was cooled and acidified with 20% v./v. sulphuric acid, then the mixture was treated with 25 parts of 25% sodium hydroxide solution and heated under reflux for 50 minutes. The mixture was cooled, acidified with 20% v./v. sulphuric acid and dioxan was distilled off. The resulting precipitate was filtered off and was extracted with sodium bicarbonate solution. The extract was acidified with dilute sulphuric acid and the resulting precipitate was filtered off and dried in air to give 10.4 parts of a light coloured solid, which was crushed with 30 parts of concentrated sulphuric acid. The mixture was allowed to stand for 40 minutes and then it was filtered through a plug of glass-wool. The filtrate was tipped onto 100 parts of ice and the resulting precipitate was filtered off, washed with water and crystallised from aqueous dioxan to give 1.5 parts of 1,5-bis-(2-carboxychromon-6-yloxy)pentane melting point 270–1°, shown to be identical with the material prepared in Example 27.

EXAMPLE 46

The activity of the new bis chromonyl compounds has been evaluated by the antigen inhalation test on human volunteers who suffer from specific allergic asthma. The degree of asthma provoked by the inhalation of an antigen to which the volunteers are sensitive can be measured by repeated estimation of the increase of air-way resistance.

A suitably designed spirometer was used to measure the forced expiratory volume at one second ($F.E.V._{1.0}$), and hence the changes in the air way resistance. The antiallergic activity of a compound is estimated from the difference between the maximum percent $F.E.V._{1.0}$ reduction following control and test provocations after drug administration conducted under identical experimental conditions.

Thus:

Percent protection = 100 ×

$$\left[ \frac{\text{Av. max. percent } F.E.V._{1.0} - \text{Max. percent } F.E.V._{1.0}}{\text{Av. max. percent } F.E.V._{1.0} \text{ Fall control shock}} \right]$$

The compounds under test were administered as an aerosol by inhalation for five minutes, two hours before challenge with antigen. The compounds for administration were dissolved in sterile water at a concentration of 0.5% and aerosolized from a Wright nebulizer operating at 10 litres/minute air flow, giving a total weight of drug aerosolized of 5 mg. The following table shows the protection obtained with a number of the new bis-chromonyl compounds.

| Compound under test | Protection, percent |
|---|---|
| Disodium salt of 1,5-bis(2-carboxychromon-5-yloxy) pentane | 30–35 |
| Disodium salt of 1,7-bis(2-carboxychromon-5-yloxy)-2,6-dihydroxy-4-oxaheptane | 25–30 |
| Disodium salt of 1,4-bis(2-carboxychromon-5-yloxy)butane | 45–50 |
| Disodium salt of 1,4-bis(2-carboxychromon-5-yloxy)-2,3-dihydroxy-butane | 40–45 |
| Disodium salt of 1,4-bis(2-carboxychromon-5-yloxy)-2-hydroxy-butane | 50–55 |
| Disodium salt of 1,4-bis(2-carboxychromon-5-yloxy)but-2-ene | 45–50 |
| Disodium salt of 1,10-bis(2-carboxychromon-5-yloxy) decane | 35–40 |
| Disodium salt of 1,6-bis(2-carboxychromon-5-yloxy)hexane | 45–50 |
| Disodium salt of 1,3-bis(2-carboxychromon-5-yloxy)-2-hydroxypropane | 65–70 |
| Disodium salt of 1,3-bis(2-carboxychromon-5-yloxy)propane | 40–45 |
| Disodium salt of 1,5-bis(2-carboxy-8-chloro-chromon-5-yloxy)pentane | 20–25 |
| Disodium salt of 1,5-bis(2-carboxychromon-6-yloxy)pentane | 20–25 |
| Disodium salt of 1,5-bis(2-carboxychromon-7-yloxy)pentane | 45–50 |
| Disodium salt of 1,3-bis(2-carboxychromon-7-yloxy)-2-hydroxypropane | 40–45 |
| Disodium salt of 1,3-bis(2-carboxy-8-ethyl-chromon-5-yloxy)-2-hydroxypropane | 20–25 |
| Disodium salt of 1,2-bis(2-carboxychromon-5-yloxymethyl) benzene | 30–35 |
| Disodium salt of 1-(2-carboxychromon-5-yloxy)-3-(2-carboxychromon-7-yloxy)-2-hydroxypropane | 45–50 |
| Disodium salt of 1,3-bis(2-carboxychromon-6-yloxy)-2-hydroxypropane | 40–45 |
| Disodium salt of 1,3-bis(2-carboxy-8-methylchromon-7-yloxy)-2-hydroxypropane | 15–20 |
| Disodium salt of 1-(2-carboxychromon-5-yloxy)-3-(2-carboxy-8-ethyl-chromon-5-yloxy)-2-hydroxypropane | 25–30 |
| Dipotassium salt of 1,3-bis (2-carboxychromon-5-yloxy)-2-chloromethyl-2-hydroxymethylpropane | 40–45 |
| Disodium salt of 1,5-bis(2-carboxychromon-5-yloxy)-3-methylpentane | 20–25 |
| Disodium salt of 1-(2-carboxychromon-5-yloxy)-3-(2-carboxy-6-chloro-chromon-7-yloxy)-2-hydroxypropane | 35–40 |
| Disodium salt of 1,3-bis(2-carboxychromon-5-yloxy)acetone | 30–35 |
| Disodium salt of 1,3-bis(2-carboxychromon-5-yloxy)-2-ethoxypropane | 30–35 |

Clinical investigations of 1,3-bis(2-carboxychromon-5-yloxy)-2-hydroxypropane in the form of its disodium salt, hereinafter referred to as Compound A, have been carried out on volunteers having clinical evidence of allergic asthma. In the case of some of the volunteers this asthma was identified as extrinsic asthma, i.e. was provoked by a specific antigen; the majority of the volunteers, however, were classified as suffering from intrinsic asthma, i.e. did not respond to a large number of skin and aerosol provocation tests.

In the case of the volunteers suffering from extrinsic asthma it was possible to assess the degree of protection afforded quantitatively using the test procedure described above.

In the case of subjects suffering from intrinsic asthma the therapeutic effect of Compound A could be assessed subjectively and by objective tests of lung function.

The results of the clinical investigations may be summarised as follows:

(1) Inhalation of Compound A in doses of 1–20 mg. repeated at 4 to 8 hour intervals is well tolerated; no side effects or other evidence of toxicity being observed during a continuous trial period of 5 months.

(2) The therapeutic effect of Compound A may be apparent in 4 hours but increases for several days with continued therapy, reaching a maximum in 1 to 2 weeks. A dose of 2–6 mg. 4 to 6 hourly induces a significant improvement as shown by objective tests of lung function in mild cases.

In more severe cases, doses of up to 20 mg. at 4 to 6 hourly intervals are required to produce a significant improvement.

In quantitative objective tests it has been found that Compound A, administered in a dose of 20 mg. gives up to 84% protection 2 hours after administration, up to 70% protection 4 hours after administration, and noticeable protection, e.g. about 20% protection 18 hours after administration.

Subjective improvement usually includes:

(a) Reduction of chest tightness;
(b) Increased tolerance to exercise; and
(c) Reduced sputum volume and cough.

Withdrawal of therapy with Compound A was followed by a relapse within 48 hours in severe cases or after 7–14 days in mild cases.

The acute i.v. toxicity of Compound A, in rats, has been found to be low; i.e. the $LD_{50}$ is at least 1000 mg./kg.

What is claimed is:

1. A pharmaceutical composition which comprises a pharmaceutical carrier and from 0.5 to about 67% by weight of a compound selected from the group consisting of a bis-chromonyl compound of the formula

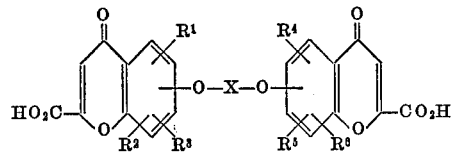

and therapeutically acceptable salts, esters and amides thereof, in which $R^1$, $R^2$, $R^3$, $R^4$, $R^5$ and $R^6$ are each selected from the group consisting of hydrogen, halogen, hydroxy, lower alkyl, lower alkoxy, hydroxyloweralkyl, haloloweralkyl, hydroxyloweralkoxy, loweralkoxyloweralkoxy and carboxyloweralkoxy; and X is selected from the group consisting of saturated and unsaturated, straight and branched hydrocarbon chains which may be interrupted by a member selected from the group consisting of benzene rings, dioxanyl, oxygen atoms and carbonyl groups, and which may be substituted by a member selected from the group consisting of halogen atoms, hydroxy groups and lower alkoxy groups.

2. A composition according to claim 1 in which the bis-chromonyl compound is in the form of a salt.

3. A composition according to claim 1 in a form suitable for administration by inhalation.

4. A pharmaceutical composition according to claim 1 comprising a solution or suspension of the active ingredient in water.

5. A pharmaceutical composition according to claim 1 in the form of an aerosol formulation.

6. A pharmaceutical composition according to claim 1 comprising the solid active ingredient diluted with a solid diluent.

7. A pharmaceutical composition in dosage unit form which comprises a pharmaceutical carrier and from 1 to 50 mg. of a compound selected from the group consisting of a bis-chromonyl compound of the formula

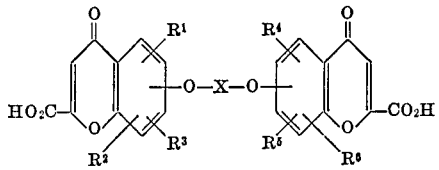

and therapeutically acceptable salts, esters and amides thereof, in which $R^1$, $R^2$, $R^3$, $R^4$, $R^5$ and $R^6$ are each selected from the group consisting of hydrogen, halogen, hydroxy, lower alkyl, lower alkoxy, hydroxyloweralkyl, haloloweralkyl, hydroxyloweralkoxy, loweralkoxyloweralkoxy and carboxyloweralkoxy; and X is selected from the group consisting of saturated and unsaturated, straight and branched hydrocarbon chains which may be interrupted by a member selected from the group consisting of benzene rings, dioxanyl, oxygen atoms and carbonyl groups, and which may be substituted by a member selected from the group consisting of halogen atoms, hydroxy groups and lower alkoxy groups.

8. A method of inhibiting the effects of the antigen antibody reaction which comprises applying to the area of the antigen-antibody reaction from 1 to 50 mg., per dose, of a member selected from the group consisting of a bis-chromonyl compound of the formula

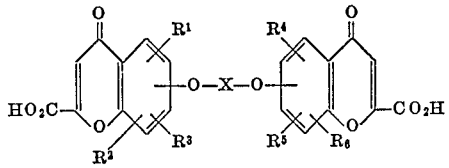

and therapeutically acceptable salts, esters and amides thereof, in which $R^1$, $R^2$, $R^3$, $R^4$, $R^5$ and $R^6$, are each selected from the group consisting of hydrogen, halogen, hydroxy, lower alkyl, lower alkoxy, hydroxyloweralkyl, haloloweralkyl, hydroxyloweralkoxy, loweralkoxyloweralkoxy and carboxyloweralkoxy; and X is selected from the group consisting of saturated and unsaturated, straight and branched hydrocarbon chains which may be interrupted by a member selected from the group consisting of benzene rings, dioxanyl, oxygen atoms and carbonyl groups, and which may be substituted by a member selected from the group consisting of halogen atoms, hydroxy groups and lower alkoxy groups.

9. A method for the prophylactic treatment of asthma which comprises administering to the patient from 1 to 50 mg., per dose, of a member selected from the group consisting of a bis-chromonyl compound of the formula

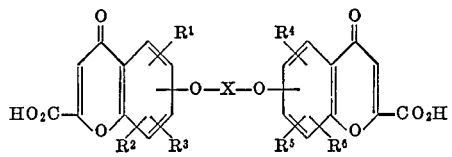

and therapeutically acceptable salts, esters and amides thereof, in which $R^1$, $R^2$, $R^3$, $R^4$, $R^5$ and $R^6$ are each selected from the group consisting of hydrogen, halogen, hydroxy, lower alkyl, lower alkoxy, hydroxyloweralkyl, haloloweralkyl, hydroxyloweralkoxy, loweralkoxyloweralkoxy, and carboxyloweralkoxy; and X is selected from the group consisting of saturated and unsaturated, straight and branched hydrocarbon chains which may be interrupted by a member selected from the group consisting of halogen atoms, hydroxy groups and lower alkoxy groups.

10. A method according to claim 9 wherein the bis-chromonyl compound is employed in the form of a salt.

References Cited
UNITED STATES PATENTS
3,686,412    8/1972    Fitzmaurice et al. _____ 424—283

RICHARD L. HUFF, Primary Examiner

UNITED STATES PATENT OFFICE
CERTIFICATE OF CORRECTION

Patent No. 3,777,033 Dated December 4, 1973

Inventor(s) Colin Fitzmaurice et al.

It is certified that error appears in the above-identified patent and that said Letters Patent are hereby corrected as shown below:

The term of this patent subsequent to Aug. 22, 1989, has been disclaimed.

Signed and sealed this 15th day of April 1975.

(SEAL)
Attest:

RUTH C. MASON
Attesting Officer

C. MARSHALL DANN
Commissioner of Patents
and Trademarks